(12) United States Patent
Kremeyer

(10) Patent No.: US 7,121,511 B2
(45) Date of Patent: *Oct. 17, 2006

(54) SHOCK WAVE MODIFICATION METHOD AND SYSTEM

(76) Inventor: Kevin Kremeyer, 1333 N. Tyndall, #212, Tucson, AZ (US) 85719

( * ) Notice: Subject to any disclaimer, the term of this patent is extended or adjusted under 35 U.S.C. 154(b) by 60 days.

This patent is subject to a terminal disclaimer.

(21) Appl. No.: 10/705,232

(22) Filed: Nov. 12, 2003

(65) Prior Publication Data

US 2005/0061908 A1 Mar. 24, 2005

Related U.S. Application Data

(63) Continuation-in-part of application No. 10/342,347, filed on Jan. 15, 2003, now abandoned, which is a continuation-in-part of application No. 09/867,752, filed on May 31, 2001, now Pat. No. 6,527,221.

(60) Provisional application No. 60/208,068, filed on May 31, 2000.

(51) Int. Cl.
*B64C 23/00* (2006.01)

(52) U.S. Cl. ............................ 244/130; 244/1 N; 239/8

(58) Field of Classification Search ............... 244/1 R, 244/1 A, 1 N, 130, 199; 239/8; 427/180
See application file for complete search history.

(56) References Cited

U.S. PATENT DOCUMENTS

| | | |
|---|---|---|
| 3,620,484 A | 11/1971 | Schoppe |
| 5,263,661 A | 11/1993 | Riley |
| 6,247,671 B1 * | 6/2001 | Saeks et al. ................ 244/205 |

OTHER PUBLICATIONS

Igor Adamovich et al., Igor Adamovich, Vish V. Subramaniam, Walter R. Lempert, and J. William Rich, "Studies of Anomalous Shock Wave Propagation and Dispersion in Weakly Ionized Plasmas", Presented at the 2nd Weakly Ionized Gases Workshop, Norfolk, VA Apr. 24-25, 1998. Proceedings published by AIAA.

J.W. Rich, I.V. Adamovich, V. V. Subramaniam, S.O. Macharet, "Shockwave Propagation in Weakly Ionized Plasmas", Presented at the Workshop on Weakly Ionized Gases, US Air Force Academy, Jun. 9-13, 1997. Printed with restricted dissemination by the Department of Defense.

Kevin Kremeyer, Sergey Nazarenko, Alan Newell, "The Role of Vorticity in Shock Propagation Through Inhomogeneous Media", Presented at the 37th Aerospace Sciences Meeting and Exhibit, Reno, NV Jan. 11-14, 1999. Proceedings published by AIAA.

(Continued)

*Primary Examiner*—Robert P. Swiatek
(74) *Attorney, Agent, or Firm*—Jones Day

(57) ABSTRACT

A shock wave in a gas is modified by emitting energy to form an extended path in the gas; heating gas along the path to form a volume of heated gas expanding outwardly from the path; and directing a path. The volume of heated gas passes through the shock wave and modifies the shock wave. This eliminates or reduces a pressure difference between gas on opposite sides of the shock wave. Electromagnetic, microwaves and/or electric discharge can be used to heat the gas along the path. This application has uses in reducing the drag on a body passing through the gas, noise reduction, controlling amount of gas into a propulsion system, and steering a body through the gas. An apparatus is also disclosed.

31 Claims, 18 Drawing Sheets

OTHER PUBLICATIONS

S.N. Chuvachev, "Ambient Air Modification for Drag Reduction: DC Discharges in Rarefied Supersonic Air Flow", Presented at the Workshop on Weakly Ionized Gases, US Air Force Academy, Jun. 9-13, 1997. Printed with restricted dissemination by the Department of Defense.

V. Skvortsov, Y.E. Kuznetsov, A.I. Klimov, B.G. Efimov, V.S. Markin, A.K. Golovnja, L.D. Vasilenko, A.H. Khvostov, L.P. Grachev, K.V. Khodataev, S.B. Leonov, V.M. Litvinov, L.N. Nedopekin, P.V. Filin, "Results of Experimental Investigation in Wind Tunnels of the Electric Discharge Influence on Aerodynamic Drag and Flow over Models", Presented at the Workshop on Weakly Ionized Gases, US Air Force Academy, Jun. 9-13, 1997. Printed with restricted dissemination by the Department of Defense.

Vladimir Bychkov, "Theoretical Analysis of Plasma Aerodynamic Experiments", Presented at the Workshop on Weakly Ionized Gases, US Air Force Academy, Jun. 9-13, 1997. Printed with restricted dissemination by the Department of Defense.

R.B. Miles, S.O. Macheret, P:.Efthimion, "Mechanisms of Shock Propagation and Stability Control in Low Temperature Plasmas", Presented at the Workshop on Weakly Ionized Gases, US Air Force Academy, Jun. 9-13, 1997. Printed with restricted dissemination by the Department of Defense.

J.A. Johnson III, R. Appartaim, J. Tate, F. Hunte, "Drag Reduction from Non-Equilibrium Plasma Chemistry for Shock-Free Supersonic Flight", Presented at the Workshop on Weakly Ionized Gases, US Air Force Academy, Jun. 9-13, 1997. Printed with restricted dissemination by the Department of Defense.

Yu. A. Ionikh, N. V. Chernysheva, A.P. Yalin, S.O. Macheret, L. Martinelli, and R. B. Miles, Shock Wave Propgation Through Glow Discharge Plasmas: Evidence of Thermal Mechanism of Shock Dispersion, Presented at the 38th Aerospace Sciences Meeting and Exhibit, Reno, NV Jan. 10-13, 2000. Proceedings published by AIAA.

B.N. Ganguly, P. Bletzinger, A. Garscadden, Shock Wave Damping and Dispersion in Nonequilibrium Low Pressure Argon Plasmas, Elsevier Press, Physics Letters A 230(1997) 218-222.

S.N. Chuvashev, A.P. Ershov, A.I. Klimov, S.B. Leonov, V.M. Shibkov, I.B. Timofeev, "Flow Around Body and Characteristics of AC/DC Discharges in Plasma Aerodynamic Experiment", Presented at the 2nd Weakly Ionized Gases Workshop, Norfolk, VA Apr. 24-25, 1998. Proceedings published by AIAA.

J. H. Mullen, R.J. Kashuba, J.D. Kelley, P. Vogel, P. Smereczniak, "Recent Progress in Plasma Aerodynamics", Presented at the 2nd Weakly Ionized Gases Workshop, Norfolk, VA Apr. 24-25, 1998. Proceedings published by AIAA.

N. Malmuth, "Basic Physical Mechanisms Associated with Plasma Aerodynamic Flow Control", Presented at the Workshop on Weakly Ionized Gases, US Air Force Academy, Jun. 9-13, 1997. Printed with restricted dissemination by the Department of Defense.

"(Plasma Power) Drag Factor", Published by Jane's Defence Weekly (UK), Jun. 17, 1998.

Kiril V. Khodataev, "The Plasma Effects in Air Dynamics. The Gas Discharge Theory Model in Aerodynamic Calculations", Presented at the 2nd Weakly Ionized Gases Workshop, Norfolk, VA Apr. 24-25, 1998. Proceedings published by AIAA.

W. Beaulieu, V. Brovkin, I. Goldberg, A. Klimov, Yu. Kolesnichenko, A. Krylov, V. Lashkov, S. Leonov, I. Mashek, M. Ryvkin, Yu. Serov, "Microwave Plasma Influence on Aerodynamic Characteristics of body in Airflow", Presented at the 2nd Weakly Ionized Gases Workshop, Norfolk, VA Apr. 24-25, 1998. Proceedings published by AIAA.

K. V. Khodataev, "Physics of Under-Critical Microwave Discharge and its Influence on Supersonic Aerodynamics and Shock Waves", Presented at the Workshop on Weakly Ionized Gases, US Air Force Academy, Jun. 9-13, 1997. Printed with restricted dissemination by the Department of Defense.

B.V. Potapkin, R.I. Asisov, G.S. Baronov, V.K. Jivotov, M.F. Krotov, V.D. Rusanov, "Non-Equilibrium Microwave Discharges in the Fast Gas Flows", Presented at the Workshop on Weakly Ionized Gases, US Air Force Academy, Jun. 9-13, 1997. Printed with restricted dissemination by the Department of Defense.

L. N. Myrado, "Air Spike, Pulsed Detonation Engine and MHD Slipstream Accelerator Research", Presented at the Workshop on Weakly Ionized Gases, US Air Force Academy, Jun. 9-13, 1997. Printed with restricted dissemination by the Department of Defense.

Y. P. Raizer, N.N. Shneider, "Drag Reduction of Hypersonic Blunt Body Due to Power Source", Presented at the Workshop on Weakly Ionized Gases, US Air Force Academy, Jun. 9-13, 1997. Printed with restricted dissemination by the Department of Defense.

Levin V.A., Afonina N.E., Gromov V.G., Georgievsky P.Yu., Terntjeva L. V., "Influence of Energy Input by Electric Discharge on Supersonic Flows around Bodies", Presented at the 2nd Weakly Ionized Gases Workshop, Norfolk, VA Apr. 24-25, 1998. Proceedings published by AIAA.

D. W. Riggins, H.F. Nelson, E. Johnson, "Blunt Body Wave Drag Reduction Using Focused Energy Deposition", Presented at the AIAA 8th International Space Planes and Hypersonics Systems and Technology Conference, Norfolk, VA Apr. 27-30, 1998. Proceedings published by AIAA.

S.J. Scott, E. Thornton, C.R. Spikings, "Further Studies of Plasma Generators for Aerodynamic Drag Reduction—Characterization of Erosive Plasma Jet Generators", Presented at the 2nd Weakly Ionized Gases Workshop, Norfolk, VA Apr. 24-25, 1998. Proceedings published by AIAA.

W. Beaulieu, A. I. Klimov, S.B. Leonov, "Physical Background of Plasma Flight Test Experiment", Presented at the Workshop on Weakly Ionized Gases, US Air Force Academy, Jun. 9-13, 1997. Printed with restricted dissemination by the Department of Defense.

G. Tchernyi, "Aerodynamics of Flying Body with Energy Release Near its Surface", Presented at the Workshop on Weakly Ionized Gases, US Air Force Academy, Jun. 9-13, 1997. Printed with restricted dissemination by the Department of Defense.

G. G. Chernyi, "The Impact of Electromagnetic Energy Addition to Air Near the Flying Body on its Aerodynamic Characteristics (Russian Contribution)", Presented at the 2nd Weakly Ionized Gases Workshop, Norfolk, VA Apr. 24-25, 1998. Proceedings published by AIAA.

P. G. P. Toro, L.N. Myrabo, H.T. Nagamatsu, "Experimental Investigation of Hypersonic 'Directed-Energy Air Spike' Inlet at Mach 10-20", Presented at the 35th Aerospace Sciences Meeting and Exhibit, Reno, NV Jan. 6-10, 1997. Proceedings published by AIAA.

A. S. Yuriev, V. Yu. Borzov, I.V. Ryibka, N.P. Savischenko, A.L. Kuranov, "Dependence of High-Speed Elements Aerodynamics on Local Heat Sources in Approaching Flow. Numerical Simulation and Wind Tunnel Tests", Presented at the 2nd Weakly Ionized Gases Workshop, Norfolk, VA Apr. 24-25, 1998. Proceedings published by AIAA.

P. K. Tretjakov, V.I. Golovitchev, C. Bruno, "Experimental and Numerical Study of Counterflow Jet Flame Stabilization in a Supersonic Air Stream", Presented at the XII ISABE, Melbourne, Australia Sep. 10-15, 1995. Proceedings published by AIAA.

C. Bruno, V.I. Golovitchev, P.K. Tretjakov, "New Trends in Improving Hypersonic Vehicles Aerodynamics and Propulsion: Flow Control by External Energy Supply", Presented at the 21st International Symposium on Space Technology and Science, Sonic City, Omiya, Japan, May 24-31, 1998. Japan Society for Aeronautical and Space Sciences.

R. McEwen, "Plasma Generation for Drag Reduction Applications at Low Supersonic Speeds", Presented at the Workshop on Weakly Ionized Gases, US Air Force Academy, Jun. 9-13, 1997. Printed with restricted dissemination by the Department of Defense.

* cited by examiner

SHOCK WAVE MODIFICATION METHOD AND SYSTEM

CROSS REFERENCE TO RELATED APPLICATIONS

This application is a Continuation-In-Part of application Ser. No. 10/342,347, filed on Jan. 15, 2003, now abandoned which is a Continuation-In-Part of application Ser. No. 09/867,752, filed on May 31, 2001, now U.S. Pat. No. 6,527,221, which claims the benefit of U.S. Provisional Application No. 60/208,068, filed on May 31, 2000, both incorporated herein by reference.

FIELD OF THE INVENTION

The present invention relates to facilitating the movement of objects through a fluid and, more particularly, to modifying shock waves within the fluid.

BACKGROUND OF THE INVENTION

When a fluid is driven to flow at a relative speed, with respect to the fluid it encounters, that exceeds the speed of sound within the encountered fluid, one or more shock waves can develop. The driving of the fluid can occur when the fluid is pressed forward by an object or body propagating through the fluid. Alternatively, the fluid can be accelerated by a pressure gradient generated by any other means, such as in wind tunnels, propulsive units, jets, and rapid heating/expansion. When a shock wave is formed in a supersonic stream of a fluid, several undesirable effects can occur.

If, for example, the supersonic stream of fluid results from a propulsive effluent stream, such as the discharge of a jet aircraft, then pressure jump(s) due to the difference in pressure across a shock wave can reduce the efficiency of the desired momentum transfer from the vehicle to the effluent stream. Additionally, a series of shock waves within the supersonic stream can augment the acoustic signature of the supersonic stream in certain frequency ranges. This augmentation of the acoustic signature is undesirable for both environmental and detection avoidance reasons. As a further example, if solid (or liquid) particles in multi-phase supersonic flow are directed to propagate across a shock wave, such as during supersonic spray deposition, a potential problem is that particles of different sizes and/or densities are affected differently when they cross the shock wave. This can result in an undesired segregation of particles, or particle size redistribution at the shock wave depending on the shock parameters and the size and/or densities of the particles. Furthermore, when a body or vehicle is driving a fluid forward, the driving body will typically feel the strong increase in pressure across the shock wave as a drag force that impedes the forward motion of the body. Another problem associated with the increase in pressure across a shock wave is an increase in temperature. Again, if the shock is being driven by a body or vehicle, high temperatures behind the shock wave can result in undesirable heating of the vehicle materials and/or components behind the shock wave. The deleterious effect of interacting shock waves and their high temperatures and pressures can be yet stronger.

The control of shock waves by reducing the strength of the shock wave or completely eliminating the shock wave is sometimes referred to as flow control. This term is used because the fluid flow is being controlled by manipulating or affecting the shock wave(s) within the fluid. When considering vehicles/bodies, flow control also encompasses processes which reduce drag. This drag can be the overall or total drag, the reduction of which is intended to optimize the performance and efficiency of the vehicle. Alternatively, the drag reduction can be preferentially applied to generate moments or torque, which is useful in maneuvering the vehicle or maintaining certain angles of attack. Flow control can also be used to reduce heating and modify acoustic signatures such as a sonic boom, which result directly from the shock waves.

As a fluid element crosses from one side of the shock wave to the other, the fluid element experiences a sharp and theoretically discontinuous increase in pressure. The magnitude of this increase or "pressure jump" is typically larger for stronger shock waves, which is characterized by a greater difference between the pressures on either side of the shock wave along a perpendicular line across the shock wave. As used herein, the term "reducing the strength" of a shock wave involves reducing the pressure difference across the shock wave along the original direction of flow by reducing or eliminating the pressure discontinuity within the fluid flow and/or diffusing or broadening the pressure jump to create a shallower pressure gradient across the shock wave in this original direction of flow. When a shock wave has been removed or eliminated, the formerly shocked flow becomes subsonic in the original direction of fluid flow although, however, the flow may be supersonic or shocked in directions transverse (not limited to orthogonal) to the original direction of the fluid flow in the specific spatial region in question.

Reducing the strength of the shock wave, or eliminating it completely, can advantageously reduce or remove a sometimes significant portion of the drag force acting on the body due to the shock wave. This can be beneficial to such bodies because a reduction in drag force increases the range and/or speed of the body. Therefore, the reduction in drag requires less energy/fuel to propel the vehicle and/or allows for a greater payload of the vehicle or body for the same amount of fuel/propellant required without invoking any drag reduction.

Another benefit of being able to reduce the strength of or eliminate the shock wave is the ability to steer the body or vehicle. If only certain portions of the shock wave are reduced in strength at a given time, such as to one side of the body, then drag on the body can be preferentially and selectively controlled. Being able to control the drag on certain parts of the body allows the body to be steered by preferentially controlling the strength of the associated shock wave(s) as well as the resulting pressure distribution along the body.

Since the first supersonic vehicle, there have been many developments to reduce the strength of shock waves; increase shock standoff distance from the vehicle; and reduce the stagnation pressure and temperature. One of the first developments was that of the aerospike 10, as illustrated in FIG. 1. This is typically a pointed protrusion extending ahead of the nose of the vehicle 12 or other critical shock-generating surfaces. The aerospike 10 effectively increases the "sharpness" of the vehicle 12, and is based on the idea of using a mechanical structure to physically push air to seed transverse motion in the fluid, thus allowing the fluid to start moving laterally out of the way before the fluid actually encounters a larger part of the vehicle 12. Because the aerospike 10 pushes air, a shock wave 14 actually begins to develop when the ambient air encounters the tip of the aerospike 10.

Other developments, as illustrated in FIG. 2, have been the injection of fluids 16, such as streams of water, gas, and heated and/or ionized fluid, toward the shock wave 14 from the vehicle 12. These fluid extensions behave similarly to the aerospike and obtain similar effects and benefits, because the counter-flowing fluid also pushes the ambient air forward and laterally before the air reaches a larger part of the vehicle 12. More recently, there have been attempts to ionize the air ahead of a vehicle and its shock wave by using radio frequency (RF) or microwave radiation. Electromagnetic methods have the benefit that they can pass through the gas without "pushing," or imparting any momentum, to the gas. The electromagnetic radiation can therefore pass through a shock wave without significantly affecting it.

The microwave methods involve creating a spot ahead of the shock wave using a microwave intensity high enough to heat and/or ionize the gas. One proposed method, as illustrated in FIG. 3A, is to focus a microwave beam 26 emanating from the front of a supersonic vehicle 24 to a point 28 ahead of the shock wave. Another proposed method using microwaves, as illustrated in FIG. 3B, has been to mount microwave horns 20 on the wings 22 on both sides of the vehicle fuselage 24. Each microwave horn 20 emits a microwave beam 26 that is alone too weak to ionize the gas. However, when the two beams 26 are crossed in front of the vehicle 24, the combined electric field 28 is strong enough to ionize the gas. Both of the aforementioned methods using microwaves disadvantageously must be operated continually to maintain a hot and/or ionized path of gas ahead of the vehicle and/or shock wave. Furthermore, both of these methods concentrate on heating a single spot ahead of the shock wave; and as such, much of the microwave energy is inefficiently used because of the resulting scattering.

Still another development has been the use of RF antennae 30 to generate a diffuse plasma near the body of the vehicle 12, as illustrated in FIG. 4. This diffuse plasma 32 mainly affects the viscosity in the boundary layer adjacent the vehicle 12 and heats a general area around the vehicle 12.

Electric discharges 34 have also been used to ionize the air around the vehicle 12, with a resulting heating geometry similar to that of the RF generated plasma, as illustrated in FIG. 5. In this method, an electrode 36 of one polarity is positioned at the tip of the vehicle 12, and several oppositely polarized electrodes 36 are positioned along the body of the vehicle 12 further downstream. When the discharge 34 is energized, the discharge 34 results in a diffuse heating/ionization around the vehicle body 12, between the oppositely polarized electrodes 36, which tends to modify the shock wave 14.

The problem of flow control at high speeds is becoming more important as the demands on both speed and maneuverability in flight systems are increasing. As previously discussed, one approach to flow control involves mechanical manipulation of the air stream around the vehicle behind the shock wave. However, an attempt to extend an object ahead of the shock wave typically creates a shock wave of its own.

Some methods of mechanical flow control behind the shock wave use the airframe and control surfaces to divert the flow or employ impulsive lateral thrusters. However, as the speed increases to higher Mach numbers, using control surfaces to steer the body requires increasingly greater power to offset the higher pressures encountered at these speeds. These power demands typically cannot be met by the control systems designed for subsonic flow and low supersonic Mach numbers.

The increasing demands and limitations on conventional control systems have led to the desire to develop new concepts for actuators and flow control systems. It is further desired to reduce or eliminate the need for moving parts and also to work with the high speed gas flow, instead of fighting against it. It is, therefore, desirable to develop a new family of control systems whose performance is optimized at extremely high speeds. For craft that may operate at both subsonic and supersonic speeds, these systems will complement the current methods of flow control, which are very effective at low speeds but increasingly impracticable at higher speeds. There is, therefore, a need for a device with a minimal number of moving parts, and whose effectiveness increases with increasing Mach number.

Additionally, there is a need for an improved method of modifying shock waves to reduce or eliminate the pressure discontinuity within the fluid flow. Such a modification to the shock wave can eliminate or reduce associated problems with momentum transfer efficiency, particulate transfer efficiency, and/or acoustic signature. Furthermore, the modification of the shock wave can reduce heating that results from the shock wave, thereby reducing the need for complex cooling methods, reducing cost, and further expanding the performance envelope of the vehicle associated with the shock wave.

Besides increased drag, sonic boom, and destructively high temperatures and pressures on their airframe and components, the shock waves produced by hypersonic and supersonic vehicles/missiles produce additional technical challenges. For example, deploying munitions from supersonic vehicles produces further complications, as the multiple bodies and shock waves interact with each other. The problems attendant with such complications are traditionally circumvented by reducing the vehicle's speed to subsonic before deployment. However, reducing the vehicle's speed to subsonic adds new elements of risk and negates the benefits of traveling at hypersonic/supersonic speeds. Therefore, there is a need for an improved method and delivery system capable of safely and reliably deploying objects, such as munitions, while maintaining supersonic cruise conditions. Furthermore, there is a need for a system that can be retroactively applied to existing air platforms. In the realm of subsonic and transonic flight, there is also room for improvement in the areas of drag reduction and flow control.

SUMMARY OF THE INVENTION

These and other needs are met by embodiments of the present invention which provide a system for modifying a shock wave in a gas by emitting energy to form an extended path in the gas; heating gas along the path to form a volume of heated gas expanding outwardly from the path; and directing a path. The volume of heated gas passes through the shock wave and modifies the shock wave. This eliminates or reduces a pressure difference between gas on opposite sides of the shock wave. Electromagnetic-, microwave- and/or electric-discharge can be used to heat the gas along the path. This application has uses in reducing the drag on a body passing through the gas, noise reduction, controlling amount of gas into a propulsion system, and steering a body through the gas. The method and apparatus can also be applied to subsonic and transonic flow.

Additional advantages of the present invention will become readily apparent to those skilled in this art from the following detailed description, wherein only an exemplary embodiment of the present invention is shown and described, simply by way of illustration of the best mode contemplated for carrying out the present invention. As will be realized, the present invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent like elements throughout and wherein.

DETAILED DESCRIPTION OF THE INVENTION

The present invention involves heating an extended path of fluid along a streamline ahead of a shock wave. A single energetic pulse can be used to heat a core of fluid, and this heated core continues to relieve/reduce the strength of the shock wave with no further energy input as the heated region of fluid streams into the initially shocked region. Alternatively, the shock may be moving into the hot/expanding fluid. The energy can be deposited, for example, by high-power electromagnetic radiation pulses or by electric discharges along an ionized path of an electromagnetic radiation pulse through the fluid. The additional energy deposition of the electric discharge allows the invention to affect a larger area, which can be useful in modifying/controlling larger diameter shock waves. The invention can also be used to modify the shock wave in such a manner as to maneuver a body through a fluid. The invention provides the ability to deposit electromagnetic energy in the form of heat and ionization along very long paths of gas/fluid.

Figure 1:
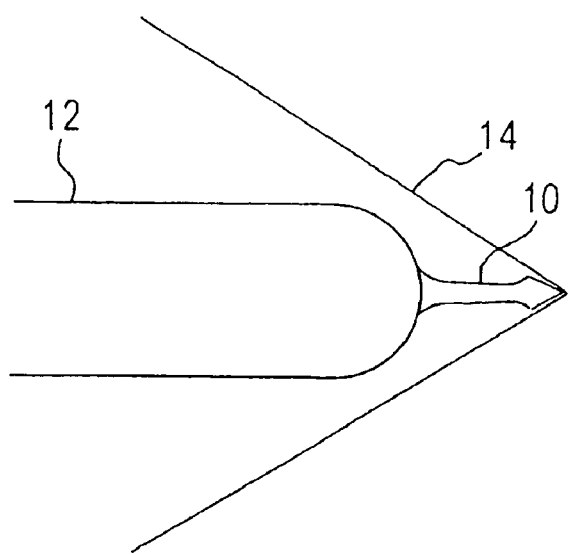
FIG. 1 is a partial side view of an aerospike in accordance with the prior art.
Figure 2:
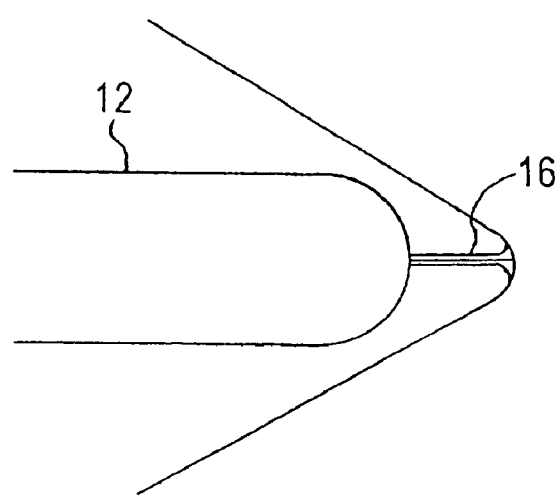
FIG. 2 is a partial side view of a method of expelling heated fluid ahead of a supersonic aircraft in accordance with the prior art.
Figure 3A:
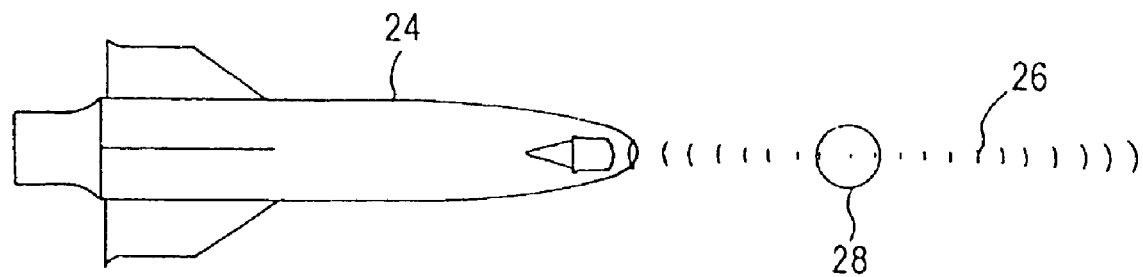
FIGS. 3A and 3B are top plan views of methods of using microwave energy to heat a specific location ahead of a supersonic vehicle in accordance with the prior art.
Figure 3B:
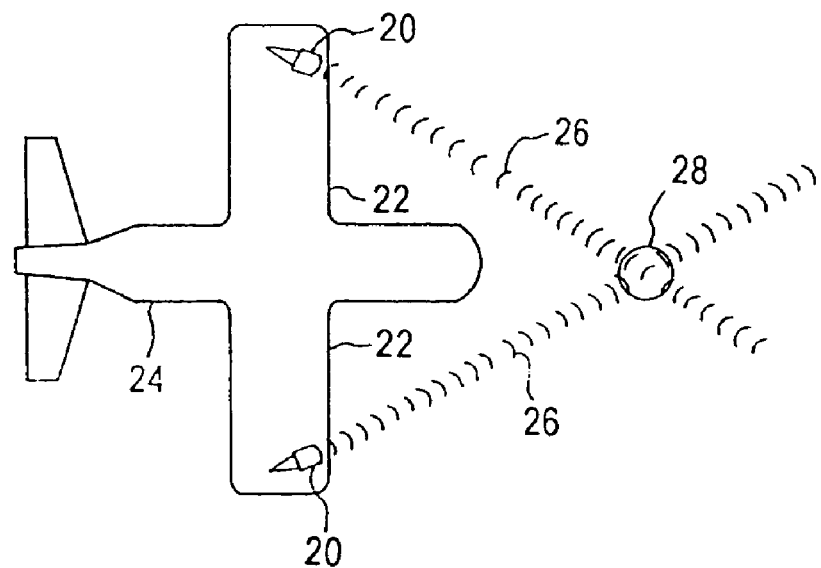
Figure 4:
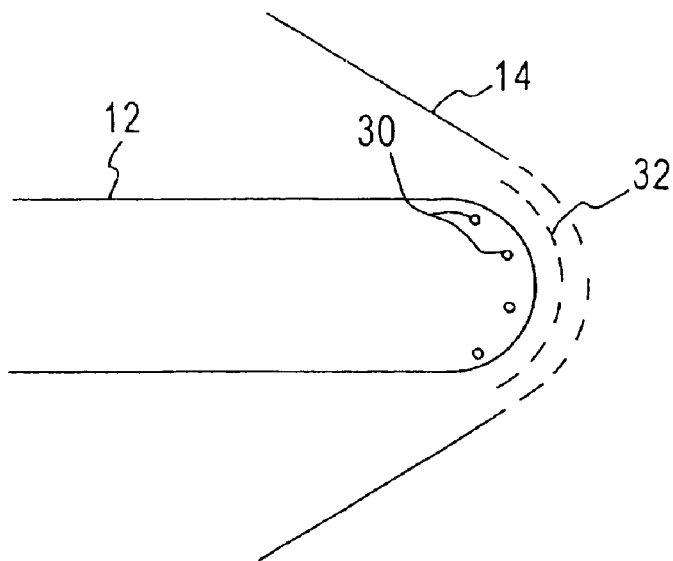
FIG. 4 is a partial side view of RF antennae on a vehicle to generate a diffuse plasma near the vehicle in accordance with the prior art.
Figure 5:
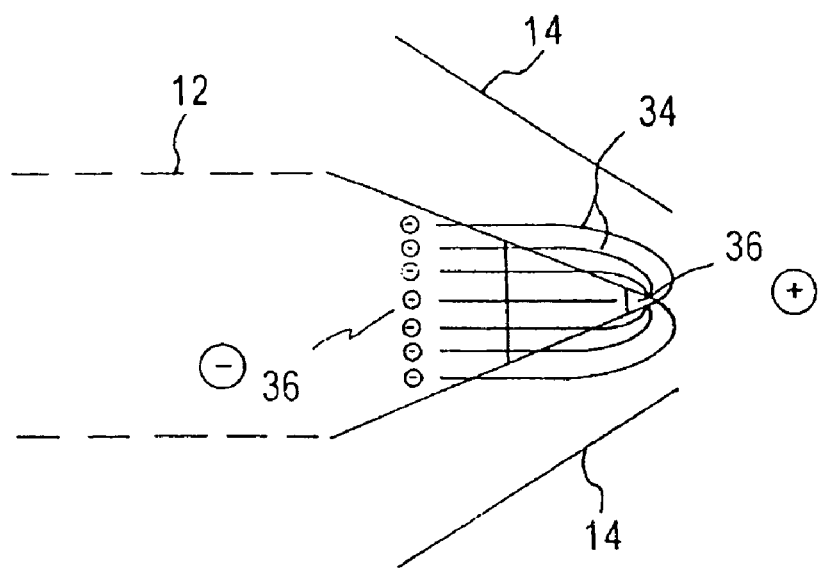
FIG. 5 is a partial side view of oppositely polarized electrodes on a vehicle in accordance with the prior art.
Figure 6:
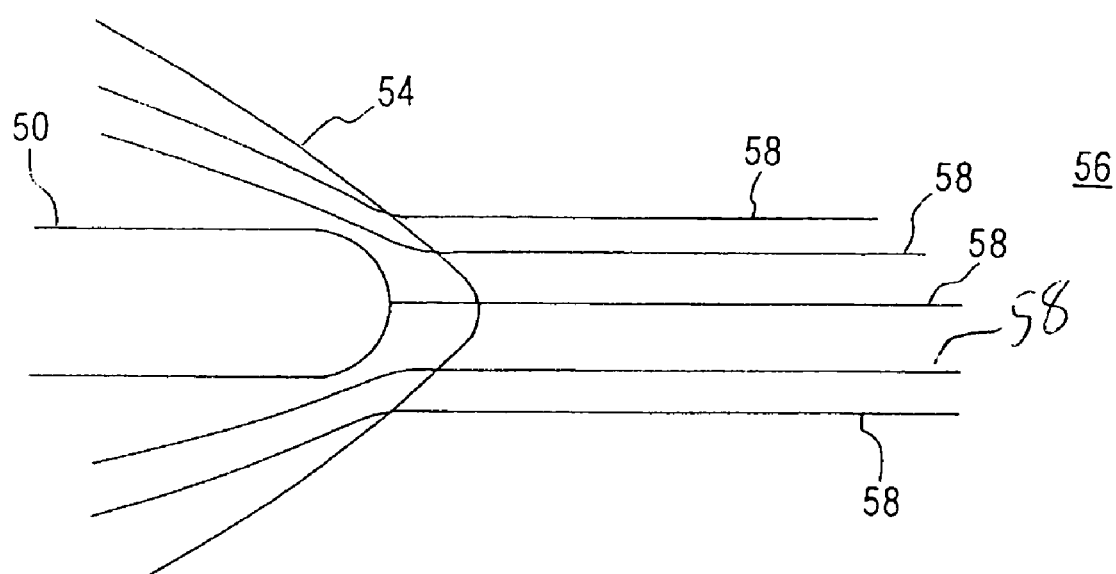
FIG. 6 is a partial top plan view of a shock wave adjacent to a body and streamlines flowing into the shock wave.

As illustrated in FIG. 6, the method and apparatus of the invention, referring to a modification, such as elimination or reduction of the strength, of a shock wave 54 in a fluid 56, and/or control of the shock wave 54, will be described in the reference frame of the unmodified shock wave 54. In this reference frame, the shock wave 54 is stationary, and the medium or fluid 56 with parameters of a given density, pressure, and temperature distribution flows into the shock wave 54 from one side of the shock wave 54. As the fluid 56 crosses the shock wave 54, the fluid 56 typically experiences an increase in these parameters, the magnitude of which depends on the Mach number of the flow. The trajectories followed by "fluid elements" as they flow into the shock wave are typically called streamlines 58. Although the shock waves 54 are intended to be modified/reduced as a result of the invention, the shock wave 54 is shown in an unaltered state for purposes of describing the invention. If the unmodified shock wave created by a body/vehicle is stationary, the shock dynamics can also be described in the rest frame of the vehicle's average motion.

It should be noted that the methods, apparatus, and systems of the present invention are applicable to any body 50 and any fluid 56 in any relationship to each other where a shock wave 54 forms in the fluid 56 and affects the fluid near the body 50. They are also applicable in any fluid flow, in which a shock wave 54 is present. Furthermore, in dense fluids, such as liquids, the methods, apparatus, and systems can be beneficially applied even in the absence of shock waves. The methods, apparatus, and systems of the present invention are also applicable to any body 50 and any fluid 56 in which a shock wave 54 is not present. In such a situation, subsonic and/or transonic flight for example, the benefit of the present invention can still be expected, albeit possibly to a lesser degree than such a situation as supersonic flight. For example, the method and apparatus of the present invention can be used to reduce drag of the body 50 moving subsonically or transonically relative to the fluid 56 by creating a path of lower density fluid 56 in front of the body 50.

Potential driving bodies 50, which create the shock wave include vehicles, such as airplanes, submarines, torpedoes, missiles, kill vehicles, launch vehicles, unmanned vehicles, supersonic/hypersonic transports, delivery vehicles, entry vehicles, and re-entry vehicles; portions of vehicles, such as protrusions, accessories, rotor blades and propeller blades; projectiles; and portions of projectiles, such as missiles, bullets, warheads, and meteoroids. Again, when traveling through a dense fluid such as a liquid, this technology can be advantageously applied, even in the absence of shock waves at subsonic speeds. The fluids 54 through which these bodies 50 pass include ionized and non-ionized gases, such as air, and its components, methane and noble gases; liquids, such as water; and mixtures of the gases and liquids, and/or other fluids such as multi-phase fluids, such as dusty gases and aerosols. Additionally, the fluids may be those encountered in non-terrestrial atmospheres. Other flows can include fluids flowing through propulsive systems, such as air, air/fuel mixtures, reactive flow; reaction products passing through and/or out of combustion engines; and ionized or charged flow passing through electromagnetically driven propulsion systems. Such flow can also take place in other flow paths such as a nozzle or duct, or even in a supersonic jet stream, defined and delineated solely by its velocity gradients.

Figure 7:
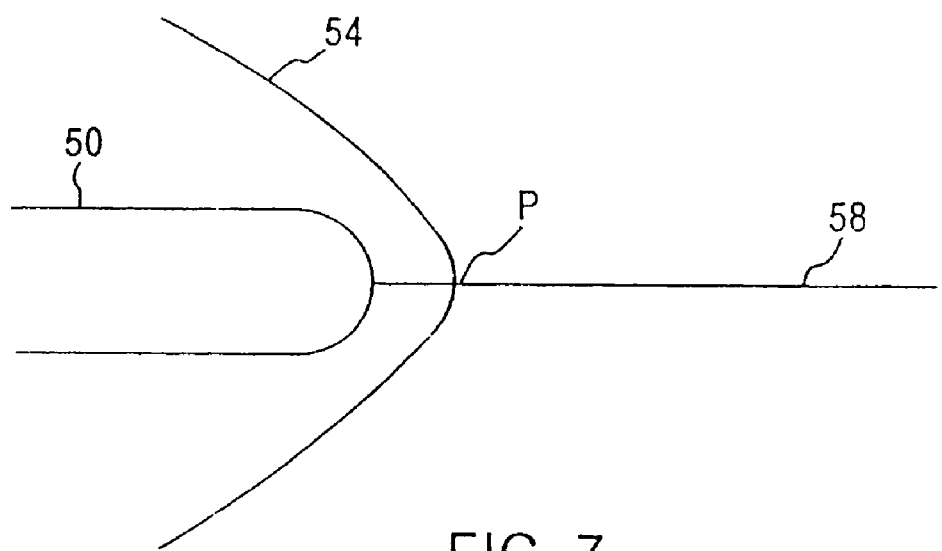
FIG. 7 illustrates a heated core being formed through the shock wave of FIG. 6 in accordance with the present invention.
Figure 8:
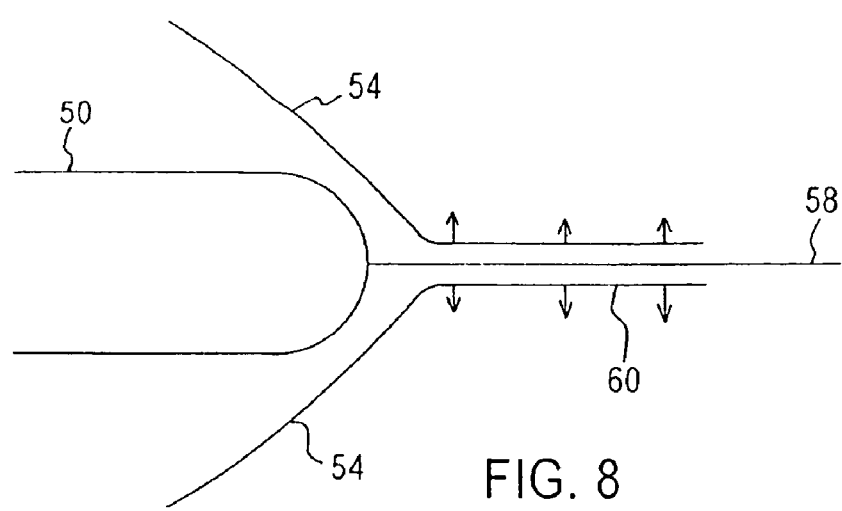
FIG. 8 illustrates the heated core of FIG. 7 expanding and puncturing the shock wave.

The method of modifying and/or controlling a shock wave 54 involves heating the incoming fluid 56 along a given streamline 58. As illustrated in FIGS. 7 and 8, in one aspect, a heated core of the fluid flows into the shock wave 54 through a particular location P in the unmodified shock wave reference frame. This process is discussed in terms of a steady shock wave, although the dynamic nature of the shock wave 54 implies that the shock wave 54 may be changing throughout the process, to which the present invention applies as well. Although, as described, the incoming streamlines 58 are approximately straight lines, the present invention is not limited in this manner, and the invention applies to streamlines that are not constant due to the evolving dynamics or are not straight lines. As the path is typically heated by electromagnetic radiation, the path is also typically effectively a straight line, and the heated path advantageously coincides with the straight streamline 58. Upon heating a fluid path ahead of the shock wave 54, an effectively cylindrical shock wave may propagate substantially outward from this path. This cylindrical shock wave will weaken as it expands, but regardless of the evolution of the cylindrical shock wave, the long heated region resulting from the different heating methods may also be referred to herein as a "low-density"/"heated" "core"/"filament" 60 at various stages of its evolution.

As illustrated in FIG. 8, the shock wave 54 can respond to the heated core in that the shock wave 54 is removed locally, such that fluid flow is no longer supersonic in that location because the speed of sound is sufficiently high in the heated core. Alternatively, the strength of the shock wave is reduced as the heated core flows into the shock wave, such that the fluid flow is still supersonic (not shown), although with a lower local Mach number.

One advantage of the present invention is that the pressure behind the shock wave is reduced locally where the shock wave meets the heated core, and this reduction in pressure occurs because the heated core acts as a channel for the escape of high-pressure gas trapped behind the shock wave. A shock wave typically forms because ambient fluid is being pushed faster than the ambient fluid's speed of sound, such that the fluid is being pushed faster than a pressure buildup can "radiate away" via sound waves. When a streamline of fluid ahead of the shock wave is heated in accordance with the present invention, the heated core becomes a channel having a lower density and a higher speed of sound than the non-heated fluid. If the temperature of the heated fluid is sufficiently high, the speed of sound within the channel can be faster than the velocity of the shock through the ambient fluid. When this occurs, the high-pressure fluid, formerly contained behind the shock wave can flow forward along the heated core, thus releasing some pressure.

The heated core forming a channel through the shock wave is analogous to a "puncturing" of the shock wave. Once the shock wave is punctured, the formerly sharp increase in pressure across the shock wave fades to a shallow pressure gradient, which drives the forward flow of heated fluid. Even if the speed of the fluid remains supersonic within the heated channel, the standoff distance increases between the body and its shock wave. Although the shock wave is not fully eliminated, this increased standoff distance and weaker shock wave are commensurate with a locally reduced pressure on the body behind the shock wave.

An additional advantage of this process, as compared to previous processes in which heated fluid was expelled in front of a body, is that previous processes have to overcome the mechanical resistance of the fluid in front of the vehicle that resists the movement of the expelled heated fluid. This is particularly a concern as the speed of the body through the fluid increases. However, the present invention does not experience this problem as the energy source to heat the fluid is not constrained by any mechanical resistance.

Given an oblique shock wave, such as with the conical bow shock of a supersonic vehicle, additional benefits can be obtained when fluid is propagating substantially laterally outward from the heated core ahead of the shock wave. When a streamline along the stagnation line is heated, the geometry of the heated core is particularly effective at seeding lateral motion away from the body that is generating the shock wave to be modified/weakened. The outward motion from the heated core precipitates more effective lateral escape of the ambient fluid when the expanding fluid core crosses the body's shock wave. Otherwise, the fluid along the stagnation line unexpectedly encounters the shock wave and stagnates temporarily in unstable lateral equilibrium. As the low-density heated core is created directly in front of the stagnation point, less fluid impinges on this point, and this results in a lower stagnation pressure and a lower stagnation temperature at that point. Additionally, the more the fluid is heated, the stronger the lateral flow is away from the heated core.

In some aspects, the creation of the heated core can be strong enough to create laterally-moving shock waves. These laterally-moving shock waves can be very effective at laterally "sweeping" the fluid from in the front of the shock wave. In the case of a liquid, strongly heating a swath of fluid along a streamline in front of a shock wave can vaporize the liquid to a gas, and this results in a large reduction in density along the heated core. Similarly, this heating drives a strong lateral movement of dense fluid away from the heated/vaporized core, and the hot, vaporized core allows for the body to more easily pass through the area previously occupied by the dense fluid. As liquids are generally much more dense than their corresponding gases, this method is particularly useful for reducing drag in liquids, even at sub-sonic speeds when there is no shock wave present.

To more effectively modify the shock wave, the heated core is formed such that as much of the heated path as possible is along a streamline coming in toward the shock, as considered in the reference frame of the shock wave. Furthermore, a stronger and quicker heating of the fluid is typically better, because this increases the size of the heated core. Also, the fluid in the heated core is yet less dense and expands outward yet faster. If the fluid is heated strongly and quickly enough, a laterally-propagating shock wave away from the heated core can be formed.

The invention is not limited as to the manner in which the heated core is created. For example, the heated core can be formed using electromagnetic radiation, such as from UV laser pulses, visible laser pulses, IR laser pulses, and/or combinations thereof. In one example, the electromagnetic radiation is provided through the use of a filamenting laser. Alternatively, the heated core can be formed using an electric discharge. The use of an electric discharge can be much more effective at heating a fluid than electromagnetic radiation, such as filamenting lasers. For example, the heating provided by electric discharge is less expensive than comparable heating provided by a filamenting laser. However, the exact path the electrical discharge takes is typically difficult to control. This presents a potential problem in situations in which a precise geometry of the path of the heated core is desired. In contrast, the path of the filamenting lasers is very controllable because the heated core is generated in the path of the laser pulse. The beginning and end of the strongly heated region can also be controlled by adjusting how the pulse is focused, in addition to other parameters described in more detail below. In some cases, however, electromagnetic radiation alone may not be able to produce a sufficiently heated core to provide an effective control/modification of the shock wave.

In one aspect of the invention, the energy source is pulsed. In so doing, energy savings can advantageously be realized. During the formation of the heated core with a single pulse, a long volume of fluid can be heated, and in certain instances a substantially cylindrical shock wave is propagated outward from the heated core. Additionally, as the heated core flows into the vehicle's shock wave, the heated core relieves the pressure behind this shock wave. Eventually, the shock wave redevelops; however, until the shock wave redevelops, the pulsed energy source has provided a period of benefit by modifying the shock wave. When the shock wave redevelops or before the redevelopment of the shock wave, the energy source can again be pulsed to provide the same benefits. In this manner, the energy source is not being continually used to obtain the benefits of modifying the shock wave. Instead, the energy source is used intermittently and can be timed to operate when heating provided by the energy source(s) produces the most dramatic and/or efficient beneficial effects. The pulse repetition rate of the energy source and the length of the resulting heated cores are not limited to a particular range and can be adjusted according to various factors, such as the density of the ambient fluid and the velocity of the fluid/shock wave.

Operating in this pulsed mode can produce results nearly as good as those for continuous heating, in fact, there are even additional benefits which come from the violent expansion outward from the suddenly heated path. Furthermore, much less energy is expended in the pulsed mode, than for comparable results obtained through continuous, or any other kind of heating in a less extended region.

Alternatively, the energy source can be continually discharged to form the heated core. For example, the continual output of an electric discharge can provide a greater overall effect on the shock wave and provide for greater drag reduction. As previously discussed, however, the continual discharge of the energy source has the disadvantage of requiring a greater energy usage and also is very difficult to guide and control.

More than just one type of energy source can be used to create the heated core. For example, electric discharge can be used in conjunction with electromagnetic radiation to create the heated core. In this example, the electric discharge is initiated and guided by the ionized path resulting from the electromagnetic energy deposited in the fluid. In operation, the electromagnetic energy, such as a filamenting laser, ionizes and heats the fluid in a substantially straight path through the fluid. The ionized fluid is more conductive than the fluid around it; and therefore, the electric discharge follows the ionized path to further heat the ionized core through ohmic heating. In addition to being conductive to an electric discharge, the ionized fluid also is very absorbent to microwave energy. Thus, microwave energy can be used in addition to, or in place of, the electric discharge to create the heated core.

One approach to forming the ionized path through the fluid for use by the electric discharge and/or microwaves is with an ionizing electric-discharge/microwave guidance system. An ionizing electromagnetic radiation/microwave guidance system, whether filamenting or not, defines an unambiguous path along which the electric discharge can deposit its energy, after escaping from a highly charged electrode or along which microwaves can deposit their energy, through absorption by the ionized region. The filamenting laser, however, results in much stronger, more effective, and more controllable ionization and energy deposition.

With the use of only one highly charged electrode, for example, at the tip of a vehicle, if an electric discharge escapes, the electric discharge will do so in a substantially uncontrolled direction along an erratic path. If an oppositely polarized second electrode is situated closely enough to the first electrode, the high voltage will discharge between these two electrodes, and again, typically with an erratic path. However, with the use of the ionizing electromagnetic radiation system, the electric discharge can be sufficiently "straightened out" to direct the electric discharge to heat streamlines coming in toward a shock wave as described above. One such ionizing electric discharge guidance system involves the use of filamenting lasers. When coupled with strong electric discharges, the filamenting laser can also be used to modify the shock wave on a smaller scale than that of using electric discharge alone. This additional flexibility allows for finer flow control. The same effect can also be achieved when microwaves are used in place of, or in addition to, the electric discharge.

Typically, when electromagnetic energy/radiation is focussed to a point to ionize a fluid, the resulting plasma disperses the beam. However, high-power pico- and femtosecond-duration laser pulses have been found to propagate over large distances, while heating/ionizing the fluid in their path and this effect has been extrapolated over yet greater distances for UV laser pulses exceeding nanoseconds in pulse duration. This phenomenon is sometimes referred to as filamentation, and filamentation has been observed using a variety of gases, such as nitrogen, helium, and air. Filamentation has also been demonstrated in liquids and solids, although with shorter propagation lengths. The wavelengths for filamentation have been observed ranging from infrared to ultraviolet, although a greater range of wavelengths is possible. The observed pulse durations for filamenting lasers have been reported to vary from picosecondsu to tens of femtoseconds, with UV filaments projected to exist using nano-second pulses and longer, leaving behind ionized paths kilometers in length. Additionally, filamentation has been observed with a variety of laser pulse frequency modulation or "chirp" profiles. The pulse energy needed to initiate filamentation has also been observed to range from millijoules to Joules.

With these filamenting lasers, creation of the long, hot filaments is generally easier when using shorter wavelengths. For example ultraviolet wavelengths ionize better than infrared wavelengths. The filamentation also typically depends on intensity-dependent "self-focussing" coefficient (s), often necessitating high intensities, especially for propagation through very low-density materials/fluids such as gases. High intensities can be achieved with high energy, short duration pulses, and for shorter wavelengths or greater photon energies, the intensity requirements are typically lower. This technology has been investigated most intensively for optical and near-optical frequencies; however, the filamentation is broadly applicable over most of the electromagnetic spectrum, and therefore not restricted to any particular set of wavelengths or frequencies.

With regard to spatial qualities, filamenting pulses have been reported to travel as far as 12 kilometers, although a more reliable value is hundreds of meters, while the filament diameters have been reported to range from 0.1 millimeter to several millimeters. As known by those skilled in the art, the laser pulse can be focussed and adjusted to control both the point at which filamentation begins and the length of the filament through the fluid in which the laser pulse propagates. The parameter ranges listed above are exemplary only and are continually being expanded. Additionally, the invention is not limited as to the particular devices used to form the filamenting pulses.

The greatest extent to which heating systems applied in the prior art can expect to significantly deposit heat using a conventional focussed beam of coherent electromagnetic radiation is about twice the Rayleigh range, centered about the beam waist. In contrast, filamenting laser pulses can significantly heat/ionize extended paths of fluid over hundreds of meters. For the systems which create these pulses, this is several orders of magnitude beyond the limitations experienced by systems utilized in the prior art. It should be noted that different pulse parameters and modulations (chirps) result in different beginning points and lengths of the filaments.

The invention is not limited as to the direction relative to the shock wave from which the energy emanates to create the heated core of fluid. For example, in certain embodiments of the invention, which will be discussed in more detail later, the energy source, such as a filamenting laser pulse, emanates from in front of the shock wave. In other embodiments, however, the pulse emanates from behind the shock wave. Either orientation of the energy source relative to the shock wave can generate substantially identical heated cores, and as such, the fluid dynamics and flow control resulting from the heated cores are substantially the same. The non-restrictive nature of the location of the energy source relative to the shock wave provides, for example, flexibility in spray deposition applications, in which both sides of the shock wave are typically accessible. As another example, when a heated core is created using both a filamenting laser and an electric discharge, which is discussed in more detail below, the vehicle can be equipped with the capacity to generate the electric discharge, and the filamenting laser that is used to guide the electric discharge can be located remotely and directed toward the moving body associated with the shock wave to be controlled. Additionally, as discussed above, microwaves can be used in place of, or in addition to, the electric discharge to create the heated core of fluid.

The invention is not limited as to the length of the heated core, as long as the heated core is capable of modifying the shock wave. For example, in certain aspects of the invention, the length of the heated core can range from about 0.01 meters to 100 meters in length. In another aspect of the invention, for example with use in overall drag reduction, the length of the heated core is about 0.1 to about 2.0 multiplied by the product of M and d (M×d), wherein M is the Mach number of the body and d is the diameter of the body or feature that is creating the shock wave. Furthermore, the invention is also not limited as to the repetition rate at which the heated core is created. In one aspect of the invention, however, the repetition rate is about 0.5 to about 10.0 multiplied by (c/d), wherein c is the ambient speed of sound. For more targeted flow control applications than general drag reduction, the heated path length can be significantly smaller with much higher repetition rates than listed above. In another aspect of the invention, the length of the heated core is between about 1.0(M×d) and about 100(M×d) with a repetition rate of between about 0.01(c/d) and about 1.0(c/d). In yet another aspect of the invention, the length of the heated core is between about 2.0 (M×d) and about 1000 (M×d) with a repetition rate of between about 0.001(c/d) and about 0.5(c/d).

The invention can be used to reduce the stagnation temperature and drag on one or more strategic points of the airframe of the body, as well as possibly reduce the total drag of the body in an economical fashion. Furthermore, the invention can be used to guide or steer the body by preferentially controlling the flow and pressure distribution around the body by directing pulses asymmetrically. For example, the path of the pulses relative to the shock wave can be actively changed to change the manner in which the shock wave is modified over time.

Figure 9:
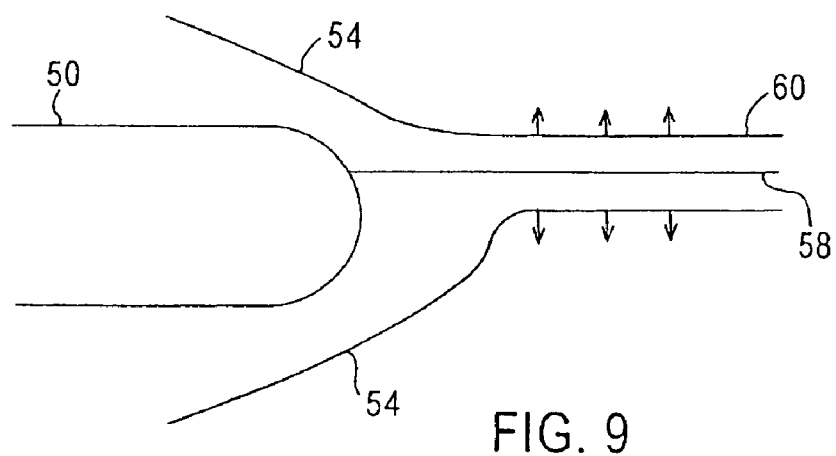
FIG. 9 illustrates a heated core being formed asymmetrically through the shock wave of FIG. 6 so as to form asymmetrical forces against the body.
Figure 10:
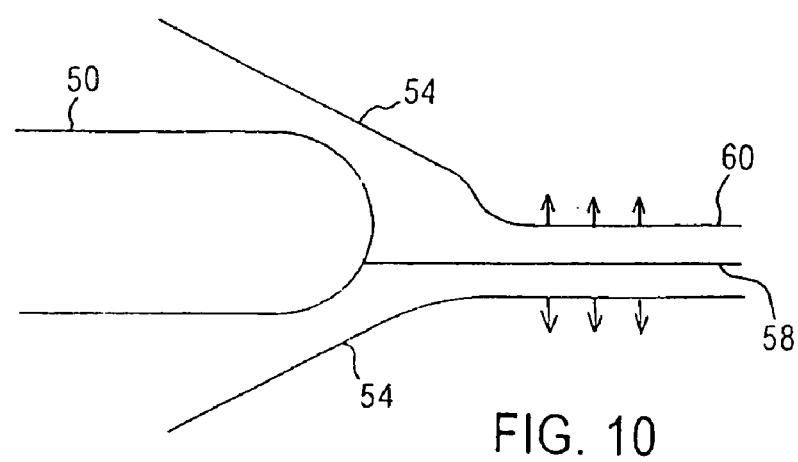
FIG. 10 illustrates a heated core being formed asymmetrically through the shock wave of FIG. 6 so as to form asymmetrical forces against the body.

As described earlier, creating a heated core along the stagnation line of a body's bow-shock wave will typically result in the greatest overall drag reduction. As illustrated in FIGS. 9 and 10, when a heated core 60 is generated preferentially on a given side of the stagnation line of the body's 50 bow-shock 54, the preferentially reduced drag will result in the capability of maneuvering the body 50, instead of or in addition to only reducing drag. This concept applies whether or not the body 50 is symmetric, although different degrees of symmetry may contribute to more or less resulting torque/moment/rotation of the body about a given axis.

The invention has application in flight systems that may operate in a subsonic or transonic regime, or in whole or in part, in a supersonic regime. There is a current emphasis on increasing speed in flight and weapons systems, and control and maneuverability are of vital concern. One application of the present invention is to eliminate the need for problematic cooling methods, necessary on certain vehicles, by reducing the stagnation temperature in front of domes/fairings, which may also be transparent in certain frequency ranges of electromagnetic radiation.

Hypersonic craft are currently limited by issues of propulsion, materials, and flow control. One advantageous aspect of the dynamics described here is that the benefits generated by the present invention increase with higher Mach numbers. As the pressure behind the shock wave becomes greater, as a result of a higher Mach number, the relative pressure reduction by the present invention increases. Therefore, greater benefits can be realized with stronger shock waves given a sufficiently heated core to puncture the shock wave.

Additionally, the minimization of moving parts also reduces the risk of actuator failure. One application of the invention is flow control during supersonic/hypersonic flight for maneuvering, drag reduction, and the control of shocks near and within supersonic inlets, exhausts, and propulsive units. Even in the situation of supersonic/hypersonic flight, where the bow-shock is attached to the vehicle and the stagnation point is ahead of the point at which the shock attaches to the body, creation of a low-density core along the stagnation line will provide great relief from the extremely high temperatures and pressures at the stagnation point as well as overall drag reduction.

In the case where a filamenting laser is used to nucleate and guide an electric discharge, precise positioning and control of the ionized filament can promote better electrical connections. Density fluctuations encountered in a medium during the formation phase of the filament, as the radiation pulse focuses to tighter spatial confinement, can be a significant source of error in the formation process. To obtain better control this formation process, the formation process can take place in a controlled atmosphere, consisting of gas pressures, temperatures, and densities, including but not limited to vacuum and any number of gases or mixtures of gases. To separate this controlled atmosphere from the external atmosphere and flow environment, through which the filament will ultimately propagate, an aerodynamic window can be implemented.

An aerodynamic window can separate two distinct cavities, each at its own distinct pressure, with a stream of gas. This stream of gas can vary in composition, and can expand through a nozzle from high pressure to low pressure. This expansion can produce a pressure gradient, which is oriented roughly transverse to the flow and which is precisely tailored to match the two external pressures which are to be separated by the flow. A hole exists in either side of the section containing the flow, through which the radiation can propagate. The physical holes are generally necessary, since any solid or liquid window would be destroyed by the high intensities of the radiation pulse or filament, and would in turn damage the filament formation process. However, because of the effectively matched pressures at either side of each hole, the radiation/filament can pass through them, while gas flow is significantly reduced either into or out of the controlled focusing chamber or across the hole leading to the external environment. The aerodynamic window allows the use of a controlled environment, in which a laser/radiation pulse can focus to create a filament, without having the problem of gas flowing into or out of the exit hole of the controlled chamber. The density fluctuations which would result from such flow would limit the desired controlled formation. The radiation can be focused such that it would have the desired beam size at a point in a self-focusing medium, such as the gas in the aerodynamic window or external environment, to allow for the desired filament formation.

Figure 29:
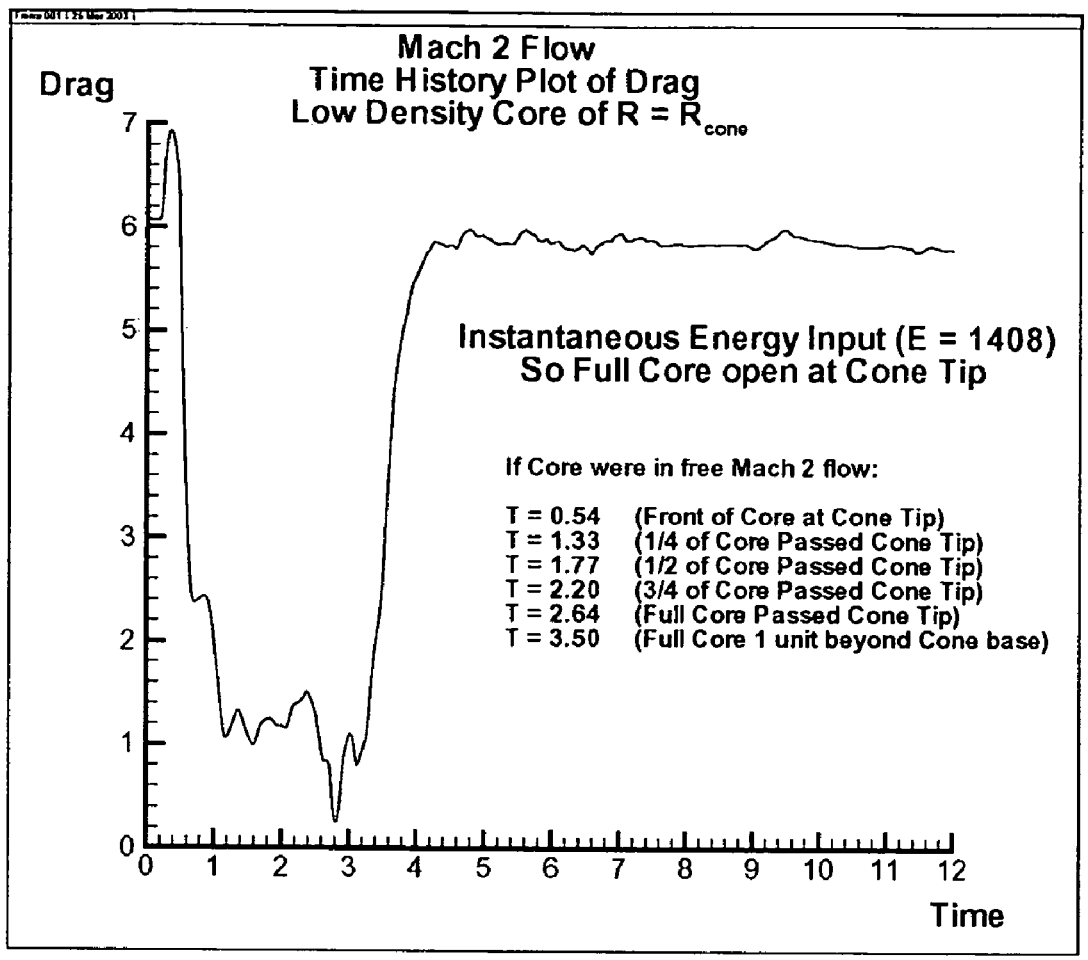
FIG. 29 is a chart graph illustrating drag for Mach 2 flow over a 45° half-angle cone at Mach 2 in accordance with the present invention.

A representative drag curve during the interaction of a cone with a heated core is shown in FIG. 29. To more quantify a benefit provided by the described drag-reduction technique, a Weighted Essentially Non-Oscillatory (WENO) numerical implementation of the Euler equations was used to model the gas flow. A cone at zero angle of attack was placed in flows of Mach 2, 4, 6, and 8, with cone half-angles of 45°, 30° and 15°. The pressure over the entire cone surface was integrated to estimate the drag on the cone, and a path five times the length of the cone was suddenly heated along the cone's stagnation line. This path was heated in a manner such that the resulting low-density core was fully opened when it reached the cone. Cores were opened up to radii equal to ¼ R, ½ R, ¾ R, and the full radius R of the cone base. The cone base was kept constant for all of the simulations, which resulted in the smaller half-angle cones being longer. Since the heated cores were five times the length of the cone, longer cores were created for smaller half-angle cones. As illustrated in FIG. 29, the drag is seen to momentarily increase when the outward moving shockwave of the core is encountered. However, the drag drops dramatically once the low-density region is entered, and the drag reduction persists, until after the core has streamed past the cone, which is after the cone has fully traversed the core.

The energy required for the cone to propagate through the air perturbed by the heating/core was compared to the energy required to propagate through the same length of undisturbed air. This comparison was integrated over the period of time, during which the perturbed drag deviated significantly from the unperturbed steady-state value. The "return" on this invested energy (i.e. the energy efficiency) was then determined by subtracting [the energy required to create the core] from [the energy saved in flight], divided by [the total amount of energy required to create the core].

Figure 30:
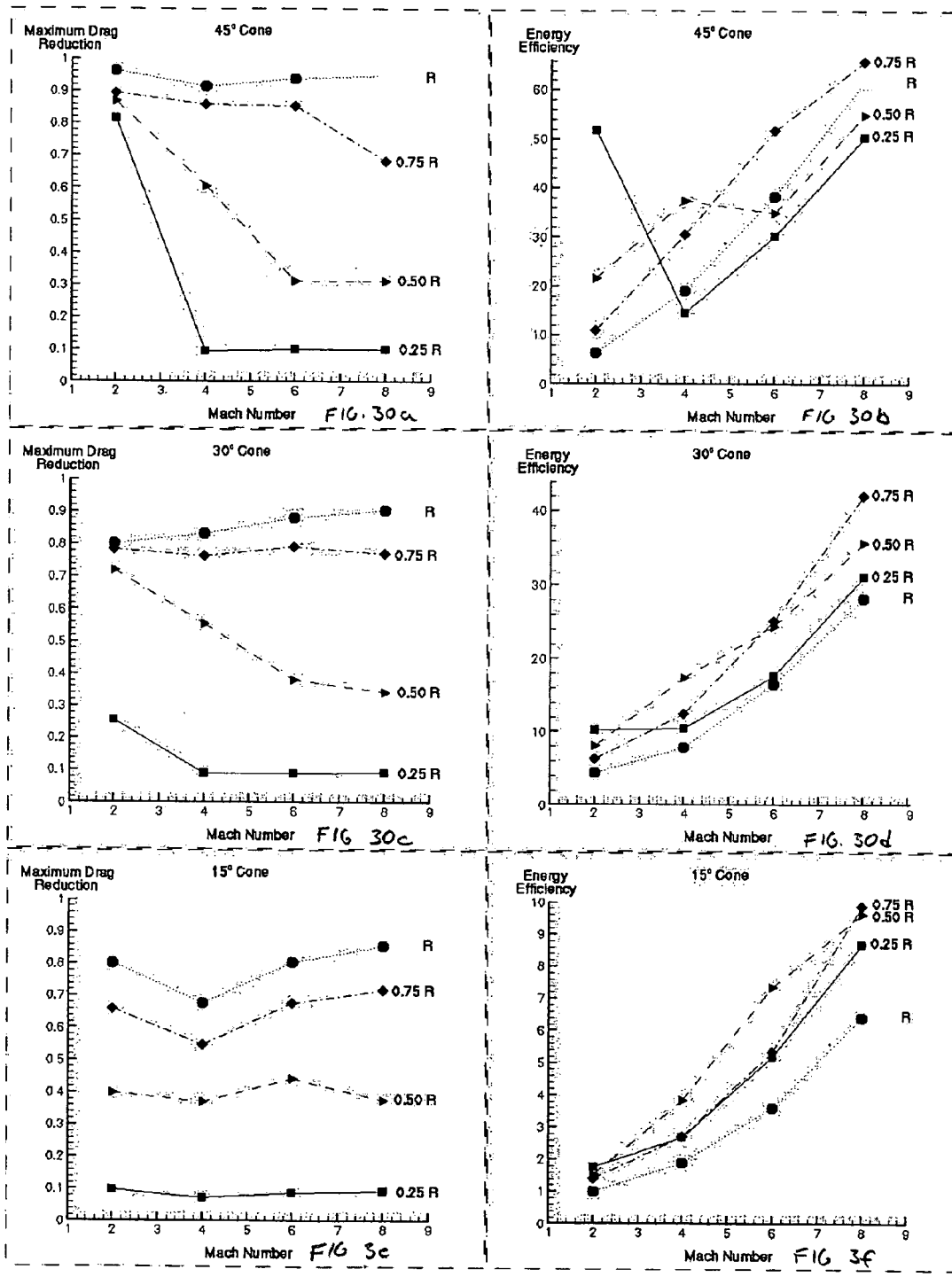
FIGS. 30$a$–$e$ are plots of Maximum Drag Reduction (FIGS. 30$a, c, e$) and Energy Efficiency (FIGS. 30$b, d, f$) for cone half-angles at 45°, 30° and 15°.

FIG. 30 shows a return of up to 65 times the invested energy for the simulations performed. Put differently, for each Joule or Watt expended ahead of the cone, 65 fewer Joules or Watts can be expended in thrust to maintain the cone's velocity. The energy efficiency depends strongly on the Mach number, the radius of the core, and the cone angle. Additional benefit may be experienced by generating longer cores. The Euler equations were used for the simulations since they capture the dynamics of the shock waves and the associated "wave drag." Additional information can be acquired by including viscous terms in the simulation. These terms are anticipated to provide further benefits because of the reduced "viscous drag" that will accompany the higher-temperature/lower-density gas.

The computational results shown here were performed over a single core. For sustained flight, it is anticipated that cores will be created repetitively. Different repetition rates will result in different energy efficiencies. The general trends of the numerical data suggest greater drag reduction for larger core diameters. Also, although there are exceptions, greater return on invested energy appears to generally be obtained at higher Mach numbers and for less stream-lined bodies (larger half-angle cones).

EXAMPLE 1

Figure 11A:
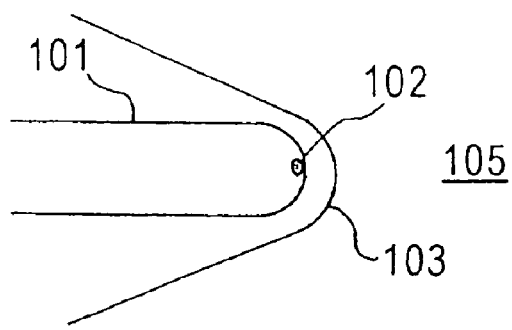
FIGS. 11A–11D is a partial top plan view of a shock wave in front of a body being punctured in accordance with the present invention.

FIGS. 11A–D illustrate use of the invention with a body 101 moving to the right through a fluid 105 at supersonic speed. In FIG. 11A, the body 101 is moving to the right through the fluid 105 at supersonic speed, as indicated by a shock wave 103 ahead of the body 101. In the rest frame of the shock wave 103, or equivalently the rest frame of the body 101, the fluid 105 ahead of the shock wave is moving to the left.

The invention is not limited as to a particular body 101. For example, the body 101 could be an airplane, a missile, a launch vehicle, a projectile, a re-entry vehicle, or any subsystem or protrusion thereon, such as an engine, the body's nose, an external fuel tank, a fairing, a tail, a wing, or external instrumentation. Furthermore, the invention is not limited as to the particular fluid 105 through which the body 101 passes. Additionally, the fluid flow need only be locally supersonic to yield a shock wave 103. The body 101 also includes a port 102 through which energy is directed. Examples of ports are described in more detail with regard to FIG. 15.

Figure 11B:
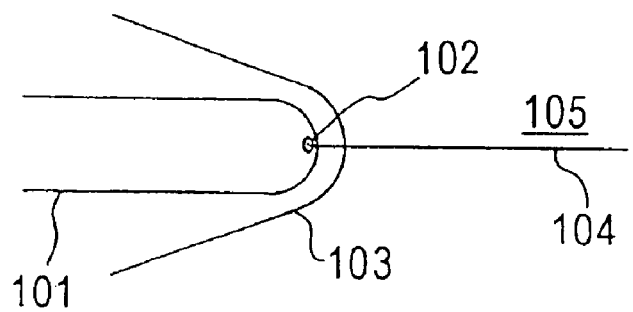

In FIG. 11B, an energy beam 104 is emitted from the port 102 and travels outward typically at the speed of light. This energy beam 104, as compared to the time scale of the fluid flow, suddenly heats an extended path of the fluid 105 ahead of the body 101. In this particular example, the energy is electromagnetic in nature, and results from the use of a laser pulse which can be, but is not limited to, an ultra-short laser pulse in the ultraviolet to the infrared range. The result of this heating method is the long, hot, ionized filament in fluid 105 along the path of the energy beam 104.

Figure 11C:
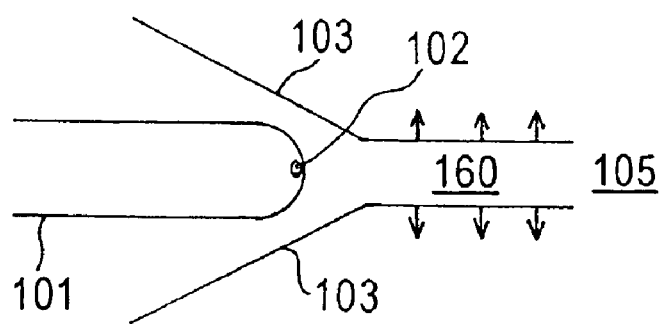

In FIG. 11C, the hot filament expands over a heated core 160, which weakens the shock wave 103 and can even temporarily locally eliminate the shock wave 103. As the body 101 travels into the expanding or fully expanded heated core 160, the shock wave 103 is locally eliminated when the speed of the body 101 is less than the local speed of sound within the heated core 160. Fluid 105 is most effectively moved out of the way of the body 101, when the heated core 160 is parallel to the direction of the body's movement through the fluid 105. This results in the most effective drag reduction and sonic boom mitigation in the acoustic far field of the body 101.

Figure 11D:
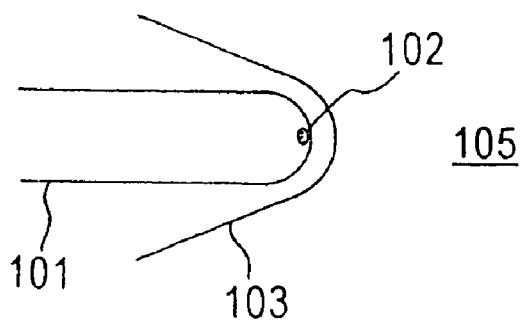

In FIG. 11D, the shock wave 103 is re-established once the effect of the heated core 160 is no longer experienced by the shock wave 103. Although the heated core 160 can extend over hundreds of meters or more, the heated core 160 can not extend infinitely. Therefore, the effect of the heated core 160 on the shock wave 103 not only diminishes, as the heated core expands outward, but also disappears once the end of the hot core is reached.

EXAMPLE 2

Figure 12:
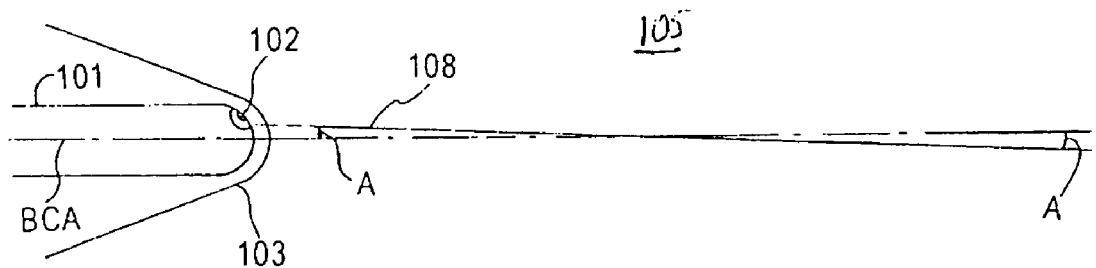
FIG. 12 is a partial side plan view of a body passing through a fluid with a non-zero angle of attack in accordance with the present invention.

FIG. 12 illustrates a use of the invention with a body 101 that is passing through a fluid 105 with a non-zero angle of attack A. The body 101 includes an energy discharge device 102 that creates a heated core along an extended path 108 through a shock wave 103 in front of the body 101. Although the extended path 108 is parallel to the motion of the body 101 through the fluid 105, the angle of the extended path 108 from energy discharge device 102 is not parallel to the body center axis (BCA) of the body 101 because of the non-zero angle of attack A of the body 101. In fact, the preferential drag reduction resulting from the off-center/asymmetric application of the heating can be used to partially or fully maintain the non-zero angle of attack A, in addition to reducing the overall drag on the body 101.

EXAMPLE 3

Figure 13:
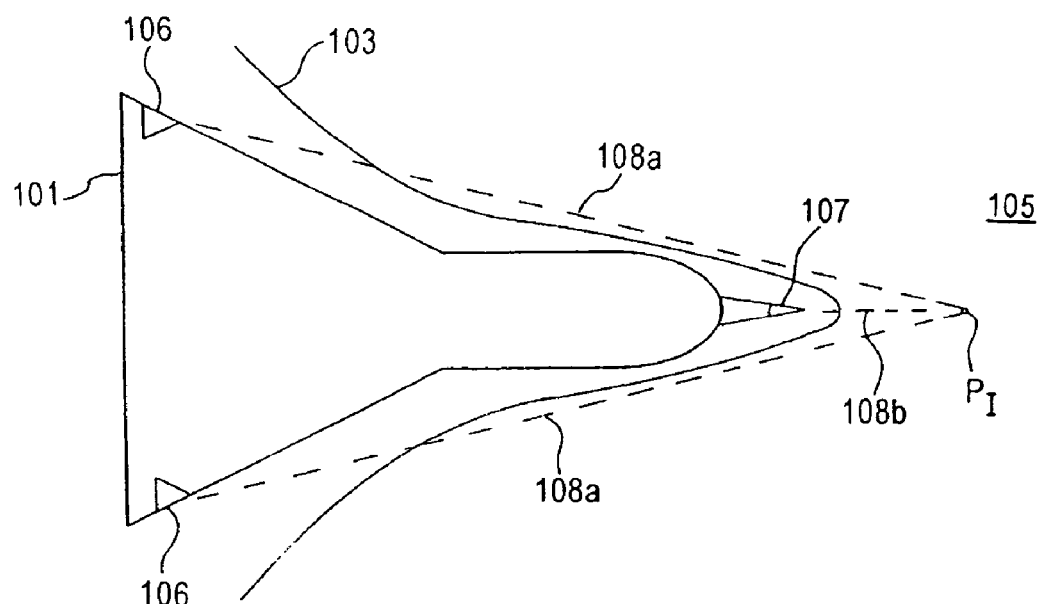
FIG. 13 is a partial top plan view of a body using a set of electromagnetic and electric discharge emitters in accordance with the present invention.

A method of increasing the energy deposition along a heated path through the use of electric discharge is illustrated in FIG. 13. A body 101 passing through a fluid 105 at supersonic speed such that a set of shock waves 103 is created adjacent to the body 101. The body includes three energy emitting mechanisms 106, 107. Although illustrated having two side energy emitting mechanisms 106 and a single central energy emitting mechanism 107, the invention is not limited in this manner. Each energy emitting mechanism 106, 107 can include one or more separate energy emitting mechanisms, and if multiple mechanism are used, these multiple mechanism can be linked in an array and/or be separate from one another.

Two of the energy emitting mechanisms 106 can be charged with a given polarity, and a third energy emitting mechanism 107 can be oppositely charged. Alternatively, the center energy emitting mechanism 107 can have an intermediate voltage relative to the two side energy emitting mechanisms 106. For example, the center energy emitting mechanism 107 can have a higher voltage than the energy emitting mechanism 106 on the right wing and a lower voltage than the energy emitting mechanism 106 on the left wing. Alternatively, the central potential of the energy emitting mechanism 107 can be at ground, the left energy emitting mechanism 106 can be positive, and the right energy emitting mechanism 106 can be negative. An example of an energy emitting mechanism is explained in more detail with regard to FIG. 14.

As used herein, the term "ground" refers to the average potential of the body 101, and the term "oppositely charged" refers to the relationship between one potential, which is greater than "ground," and another potential, which is below "ground." Thus, as discussed above, a discharge between two locations, such as nose and wings of the body 101, can be achieved by having the nose at a different potential from the wings, which are maintained at a common potential. A conducting path is then created between wings and nose to generate the desired electric discharge, which deposits energy into the flow. The wings do not have to share a common potential to generate the desired discharges. For example, one wing may have an electric potential above the electrical potential of the nose, while the other wing may have an electrical potential below the electrical potential of the nose. This can help ensure that discharge will take place simultaneously between the nose and both wings instead of discharging only between the nose and one wing).

It should be noted that any suitably large difference in electric potentials can be used to generate an electric discharge between two elements without regard to potentials of other elements, or the timing of independent discharges. Thus, discharges between elements can be implemented given a sufficient voltage difference between the elements in question and given suitable nucleation of the discharge. This implementation is independent of the electrical potential of other elements and the timing of other discharges.

To better control the electric discharge path of the energy emitting mechanisms 106, 107, each of the energy emitting mechanisms includes an electromagnetic discharge port that is capable of ionizing a path 108 through the fluid 105. The conductive ionized paths 108 intersect at a point P₁ ahead of the body 101 and ahead of the shock wave 103. The ionized paths 108 provide a conductive circuit along which the oppositely charged energy emitting mechanisms 106, 107 can discharge. Such an electric discharge can deposit energy into the fluid 105 more economically than with electromagnetic radiation alone.

The geometry shown creates a heated core along the ionized paths 108a, 108b. As such, not only is fluid heated immediately in front of the body 101 along the stagnation line on the axis of symmetry using one ionized path 108b, but the heated cores along ionized paths 108a can also have the ancillary benefit of pushing some fluid 105 out of the way of the wings of the body 101. However, because these ionization paths 108a are not along incoming streamlines, the effect of the heated cores is not as efficient, nor as effective as the heated core along the center ionized path 108b. This example with the stagnation line being collinear with an axis of symmetry is illustrative, and is not meant to be restrictive.

As previously discussed, microwave energy can be used in addition to, or in place of, the electric discharge to create the heated core. Thus, instead of emitting an electric discharge to heat the ionized path, the energy emitting mechanisms 106, 107 can include microwave emitters. Although three microwave emitters 106, 107 are illustrated in FIG. 13, a single microwave emitter can be used or several microwave emitters can be used. Furthermore, instead of having the energy emitting mechanisms 106, 107 be microwave emitters, the one or more microwave emitters can be in addition to the energy emitting mechanisms 106, 107 that emit the electric discharge, filamenting laser, and/or other energy. It should be further noted that the invention is not limited to microwaves and/or electric discharge being emitted from the energy emitting mechanisms 106, 107, as other types of energy can be emitted.

Figure 14:
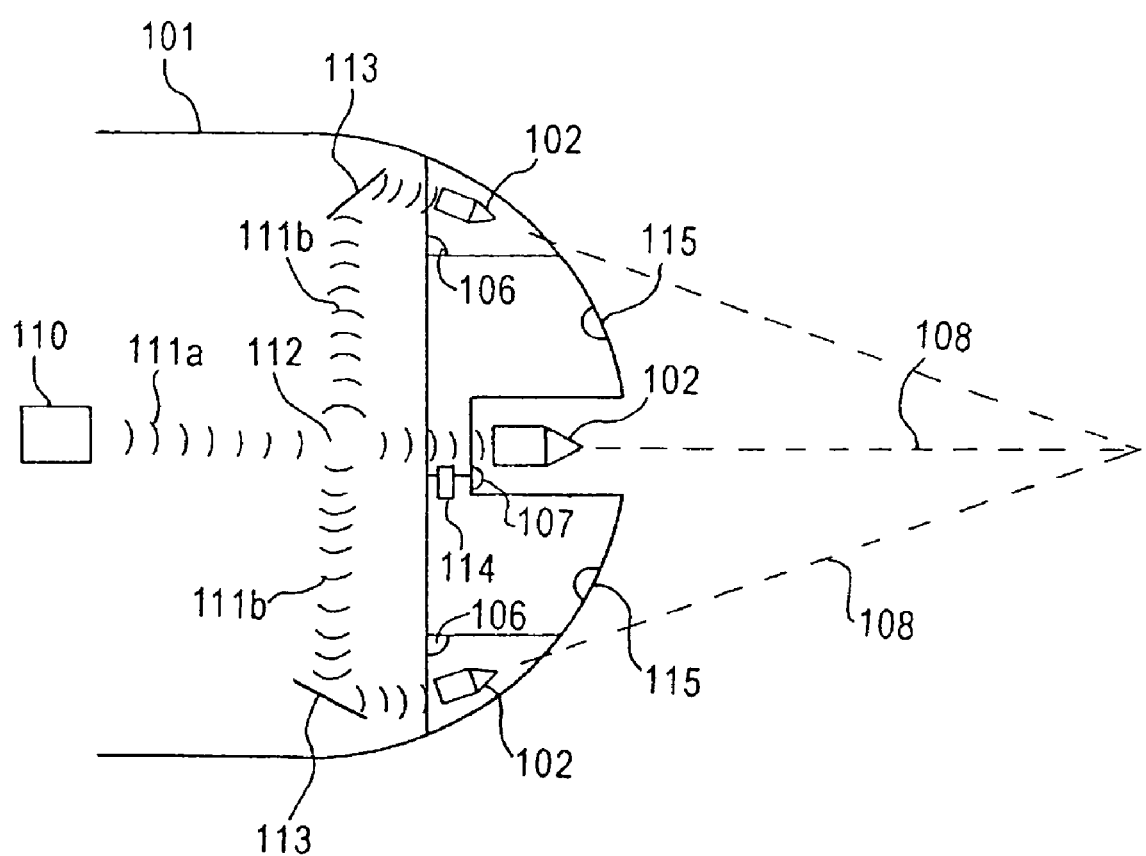
FIG. 14 is a schematic view of electromagnetic and electric discharge emitters similar to those in FIG. 13.

A more specific manifestation of the energy emitting mechanisms previously discussed in FIG. 13 is illustrated in more detail in FIG. 14. A body 101 includes several directed energy ports 106, 107. The energy ports 106, 107 are electrically isolated from each other, with two of the energy ports 106 having one polarity and the other energy port 107 having an opposite polarity. The electric discharge from the energy ports 106, 107 can be driven by one or more charge-storage and/or voltage-supply elements 114.

The electromagnetic energy is emitted from a source 110, which can consist of a single emitter, as illustrated, or several emitters. The electromagnetic pulses 111 can be generated in rapid enough succession to be considered effectively instantaneous by the fluid dynamics being controlled. Additionally, if only one emitter is used, a single pulse 111a may also be split at a splitter 112 and sent to the different electromagnetic emission ports 102. The split pulses 111b can be redirected using reflecting elements 113 and sent through focussing elements at the emission ports 102 to create the desired conducting circuit of ionized paths 108 to initiate and guide the electric discharge from the energy ports 106, 107.

The entire process can be continually monitored by environmental sensors 115 to ensure effective implementation of the process through continual adjustments to the electric and electromagnetic discharges to accommodate changing factors and needs. The electrical isolation of the energy ports 106, 107 is aided because only optical coupling is required in the internal systems. An example of an optical system for use with the emission ports 102 is described in more detail with reference to FIG. 15.

Figure 15:
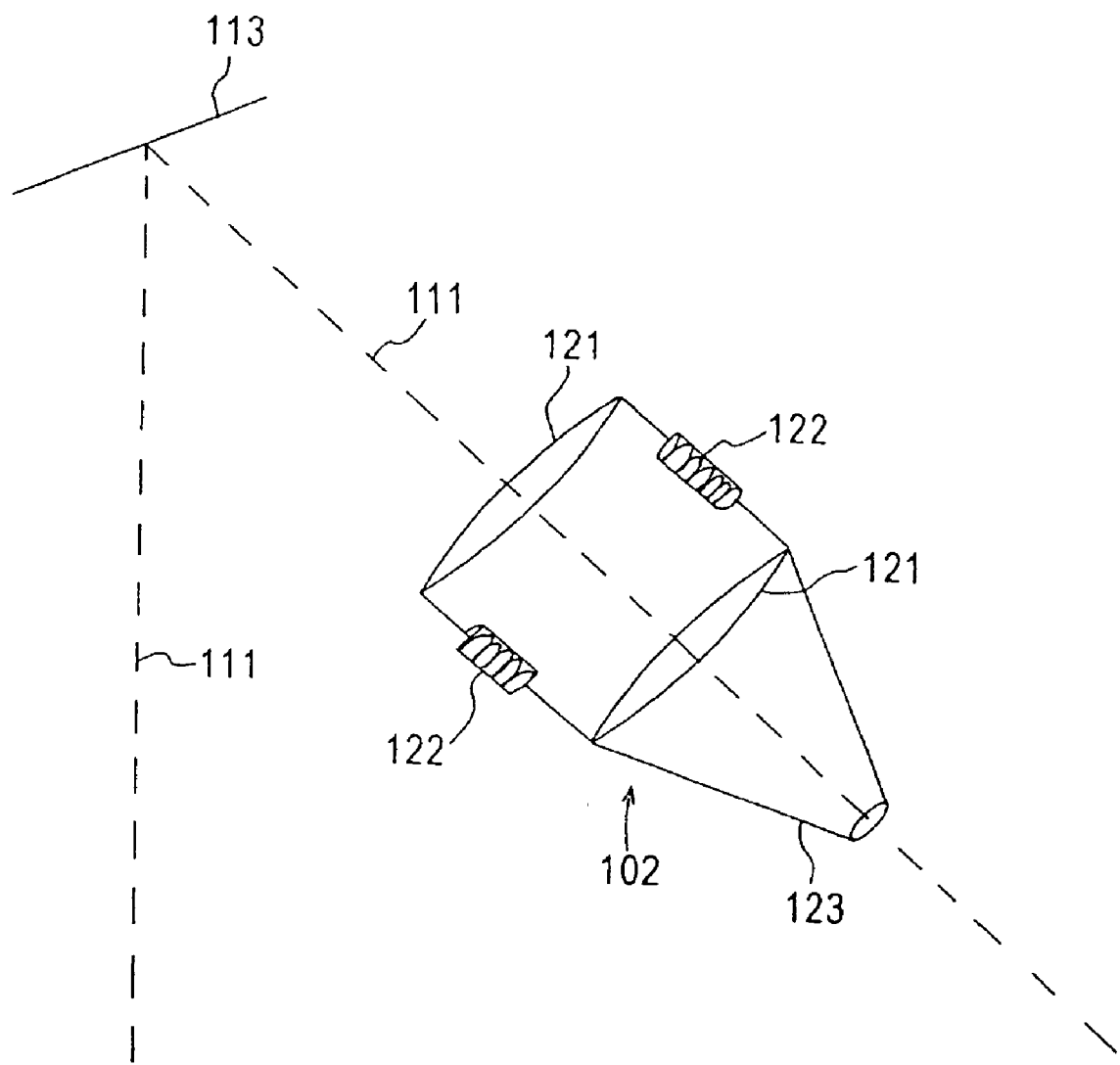
FIG. 15 is an enlarged schematic view of an emission port shown in FIG. 14.

A more specific manifestation of an emission port previously discussed in FIG. 14 is illustrated in more detail in FIG. 15. If necessary, reflecting elements 113 direct the pulse 111 of electromagnetic energy into the emission port 102. The emission port 102 includes focussing elements 121 that are adjustable with a mechanism 122 to control the point at which the ionized path begins. Additionally, an electrically conducting tapered housing 123 can be included with the emission port 102 to couple an electric discharge to the ionized path created by the electromagnetic pulse 111.

EXAMPLE 4

Figure 16A:
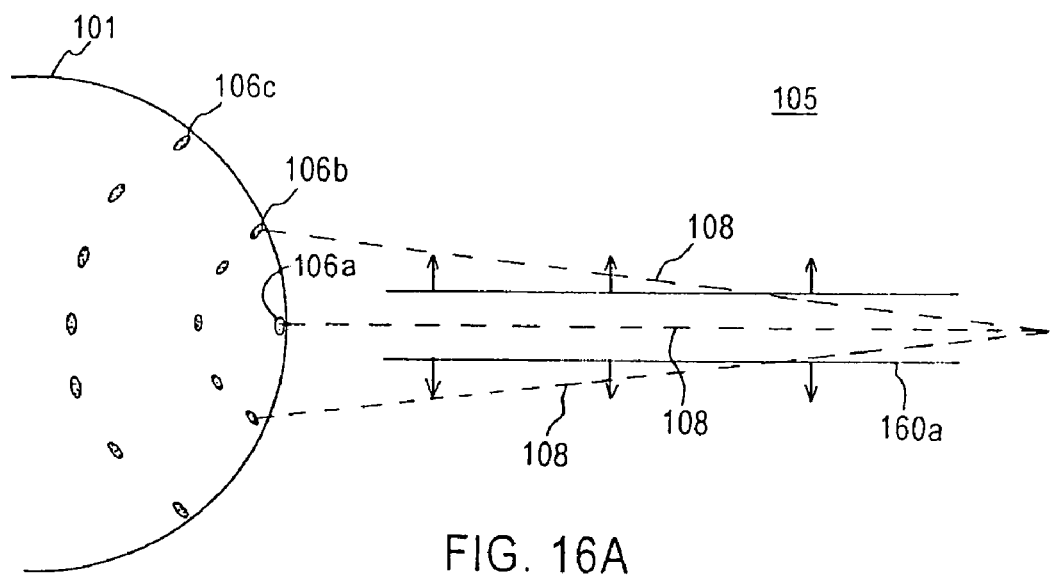
FIGS. 16A and 16B are partial plan views of a body using an array of energy discharge devices in accordance with the present invention.
Figure 16B:
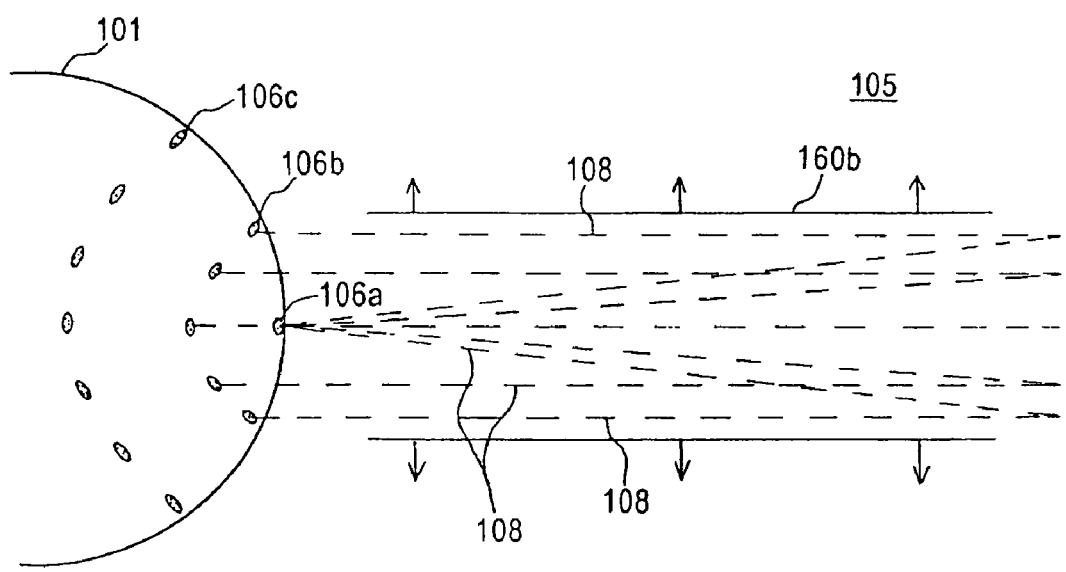

An array of energy discharge devices is illustrated in FIGS. 16A, 16B. An array of energy emitting mechanisms or elements 106a, 106b, 106c is arranged on a body 101. The body 101 includes a central element 106a surrounded by an inner annular array of elements 106b and an outer annular array of elements 106c. The total array of elements 106 can be used to increase effectiveness of the invention by firing the individual elements 106 or groups of elements 106 in succession. The effectiveness of the invention can be increased by using the array of elements 106 to continue to push the fluid 105 cylindrically outward, after the fluid expanded outward from the central heated core, generated by the central element 106a.

Although the elements 106 shown emit an electrical discharge, the array is not limited in this manner. For example, the array can include both electric discharge elements 106 and electromagnetic emission ports or can consist of only electromagnetic emission ports. In this example, when an electrical discharge is being used, the electrical discharge follows ionized paths 108 that complete separate conducting circuits between elements 106b and 106a. The next set of conductive paths and discharges could then be between 106c and 106a (or 106b).

In operation, as illustrated in FIG. 16A, the central element 106a and one or more elements 106b of the inner array would be fired to create a central heated core 160a. This heated core would expand outward, possibly bounded by a cylindrical shock wave, which would weaken with the expansion. To add energy to the weakened cylindrical expansion, elements 106b could be fired, as illustrated in FIG. 16B. Upon further expansion, elements 106c of the outer array would then also be fired to maintain a strong continued expansion of the heated core 160b.

EXAMPLE 5

Figure 17:
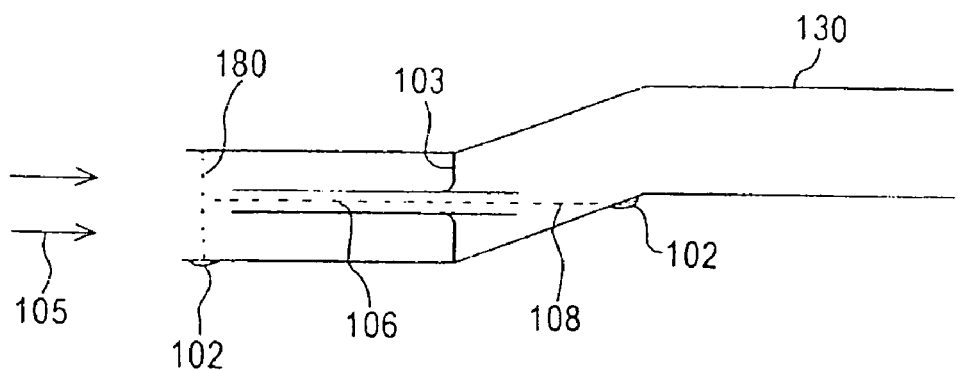
FIG. 17 is a partial cross-sectional view of a propulsion unit using energy discharge devices in accordance with the present invention.

Use of the method of the present invention with a propulsion unit, such as a scramjet 130, is illustrated in FIG. 17. When fluid 105, such as air, enters the scramjet 130 at a sufficiently high velocity, a shock wave 103 develops within the scramjet 130. By positioning energy discharge device(s) 102 and possibly thin electrodes 180, whether electric discharge, electromagnetic, or both, within the intake of the scramjet 130, a heated core expanding from the path of energy deposition 108 can be created within the scramjet to "puncture" the shock wave 103 according to the invention. In addition to mitigating efficiency losses due to the shock wave, the heated core can also provide the ancillary benefits of heating and ionizing the fluid to help the reaction in the scramjet engine, as well as helping the mixing process and energy recuperation.

Although shown positioned in the flow path of the scramjet 130, the energy discharge device(s) 102 are not limited to these particular positions. The energy discharge device(s)

102 can be located in any positions that advantageously allow the energy discharge device to modify a shock wave according to the invention. For example, the shock wave can be located in front of the intake; and therefore, the energy discharge devices can also be located in front of the intake, if necessary. Furthermore, this concept can be applied to similar types of geometries, including the inlets and flow paths of other types of propulsion units.

EXAMPLE 6

Figure 18:
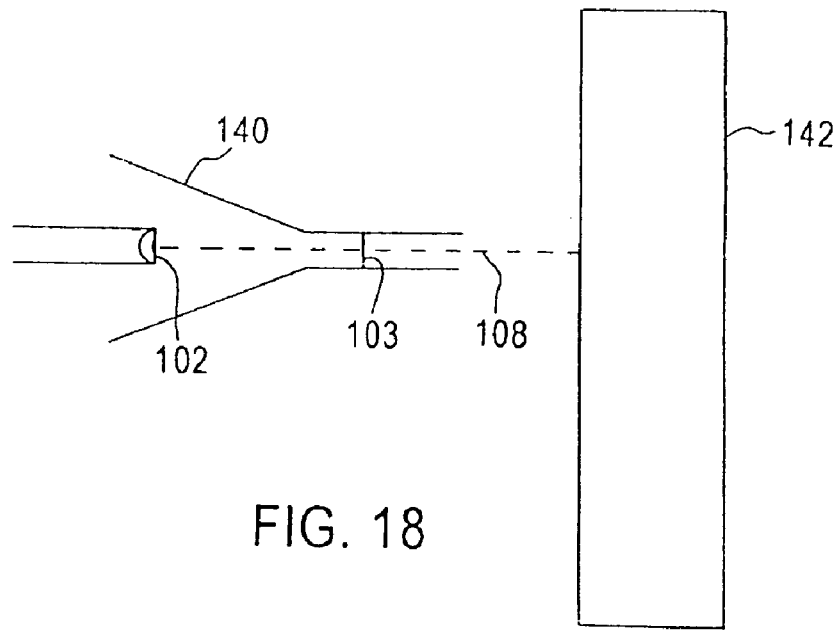
FIG. 18 is a partial cross-sectional view of a supersonic spray deposition unit using an energy discharge device in accordance with the present invention.
Figure 19:
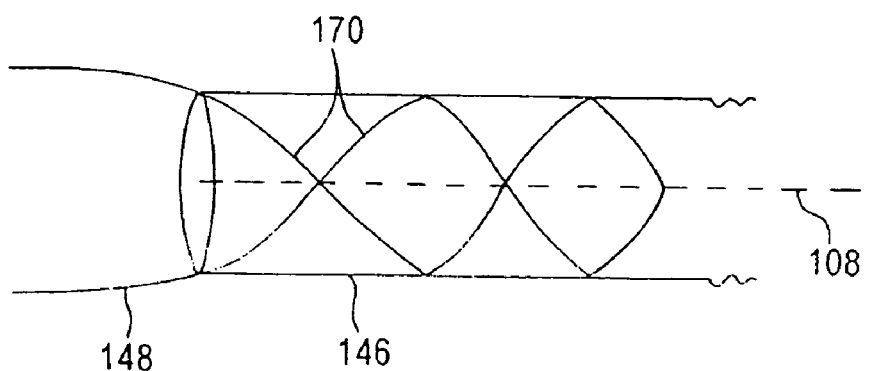
FIG. 19 is a partial top plan view of a propulsion unit using an energy discharge devices to modify the acoustic signature of the propulsion unit in accordance with the present invention.
Figure 20:
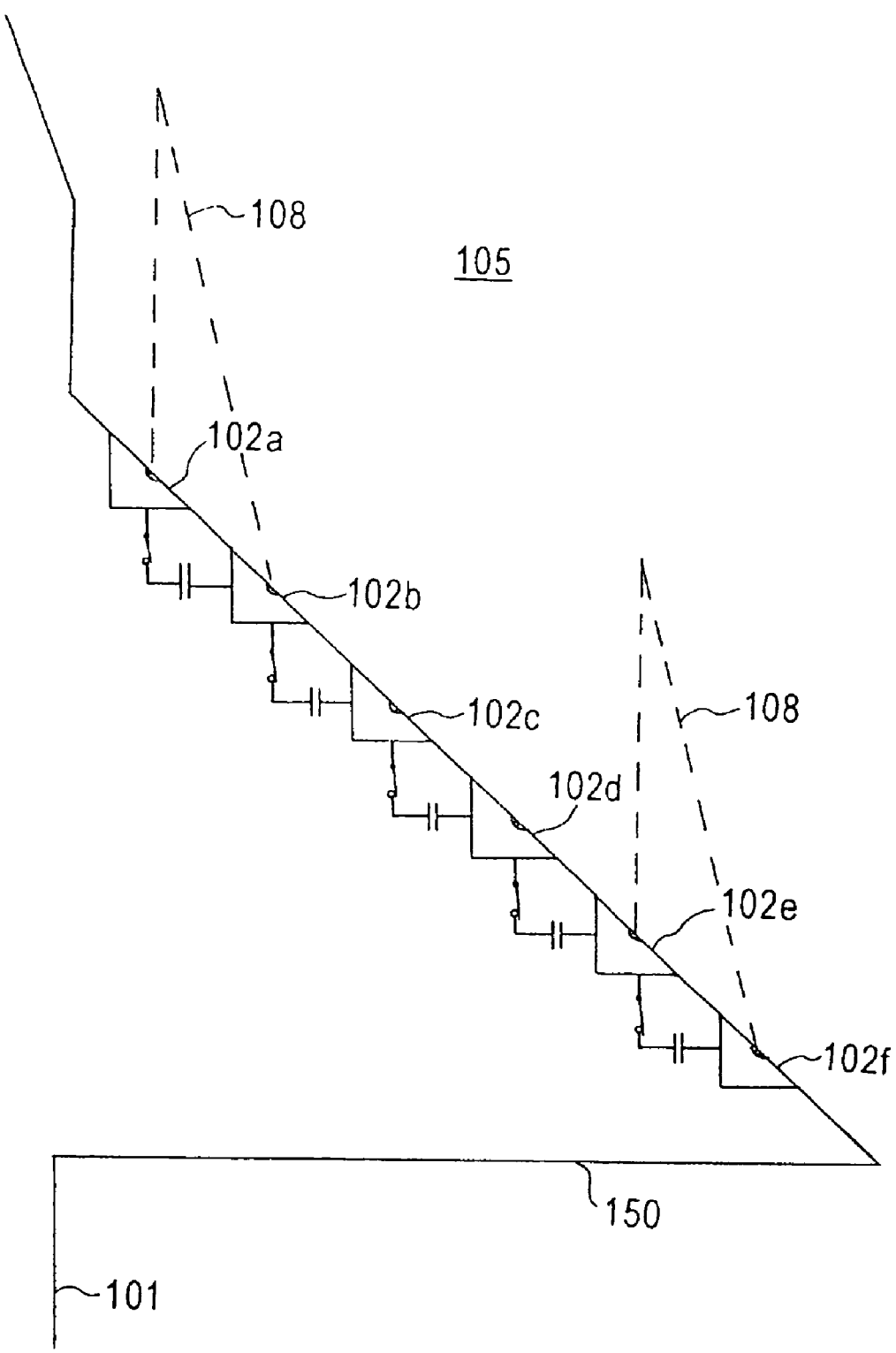
FIG. 20 is a partial top plan view of a wing on an aircraft using a linear array of energy discharge devices in accordance with the present invention.
Figure 21A:
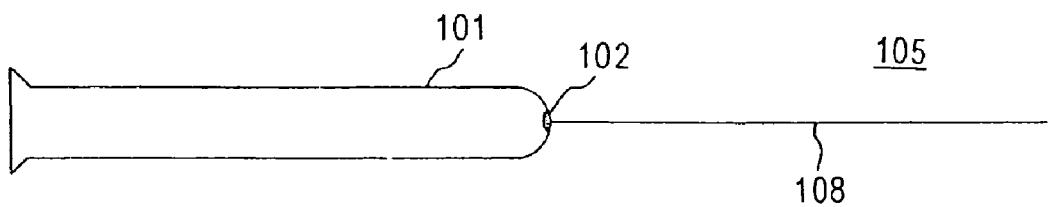
FIGS. 21A and 21B are plan views of a submersible body using energy discharge devices in accordance with the present invention.
Figure 21B:
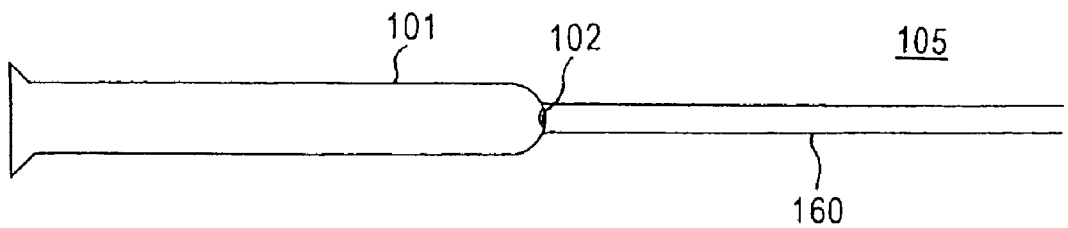
Figure 22:
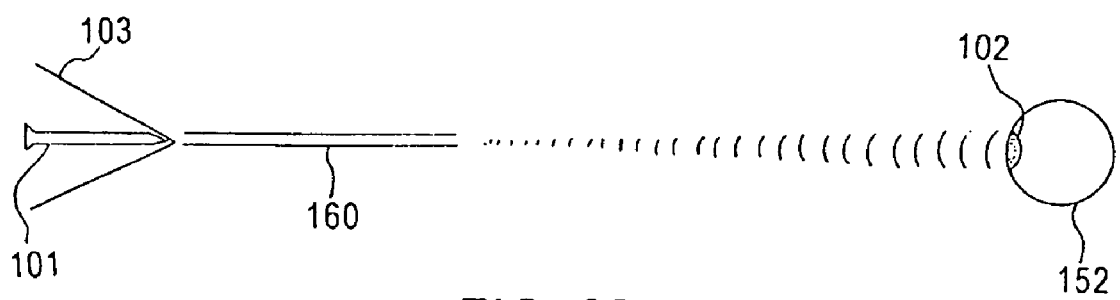
FIG. 22 is a plan view of a heated core being generated adjacent to a body from an energy discharge device located away from the body in accordance with the present invention.
Figure 23:
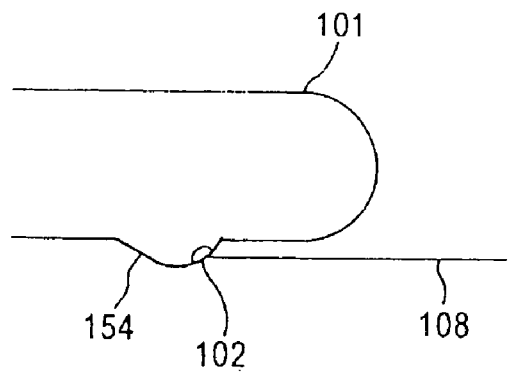
FIG. 23 is a side view of a protrusion on a body using an energy discharge device in accordance with the present invention.

The use of the invention with supersonic spray deposition is illustrated in FIG. 18. In this process, particles are propelled at supersonic speed through a nozzle 140 toward a target 142. One or more shock waves 103 can develop in various positions within and outside of the nozzle 140. One of the problems caused by the shock waves 103 in this process is the segregation of particle sizes and densities which occurs when crossing the shock wave 103. An energy discharge device 102 can be placed within the nozzle 140 to create a heated core along a streamline ahead of the shock wave 103. The energy discharge device can use directed ionizing electromagnetic radiation alone, or use this ionization to initiate and guide an electric discharge.

As the target 142 can be electrically conducting, the electrical discharge path 108 can be much less complicated, potentially requiring only one energy discharge device 102 to complete a circuit from the electrical discharge. Additionally, the use of electric discharge is possible without creating an ionized path to guide the electric discharge. This can be accomplished by using particular electrode geometries in conjunction with electrically insulating materials in the nozzle 140. In addition to mitigating the shock, both electromagnetic radiation and electric discharge can advantageously modify deposition processes and surface treatments.

EXAMPLE 7

One embodiment of the present invention to reduce noise is illustrated in FIG. 19. Shock waves and expansion waves 170 are formed in the exhaust 146 of a propulsion unit 148, such as a jet turbine, after-burner, rocket motor/engine, or other types of propulsion units. In such a situation, the shock and expansion waves 170 typically form "shock diamonds," which can be established within the exhaust. These patterns can contribute strongly to an augmentation of the acoustic signature in certain frequency ranges, which is sometimes referred to as "screech." The method of the present invention can disrupt these patterns by providing a heated core along an extended path 108 through the pattern of expansion and shock waves 170. This technique can also be used to dissipate shock waves formed within the propulsion unit.

The heated core can be formed using electromagnetic radiation and/or an electric discharge. In the situation of an electric discharge, the need to ionize the fluid so as to obtain a path for the electric discharge is not necessary as the exhaust is already partially electrically conductive, and erratic disruption is sufficient to disrupt this particular shock wave pattern. The existing ionization may also have a deleterious effect on the propagation of certain electromagnetic frequencies.

EXAMPLE 8

A schematic representation of one possible application of a linear array of energy discharge devices 102, similar to those depicted in FIGS. 14 and 15, is illustrated in FIG. 20. The energy discharge devices 102 are mounted on a vehicle 101 to push incoming fluid 105 outward along the wing 150, in a wavelike motion, by firing sequentially from the innermost energy discharge device 102*a* to the outermost energy discharge device 102*f* furthest from the centerline of the vehicle 101. These energy discharge devices 102 can either be limited to ionizing electromagnetic radiation, or coupled with electrical discharge units.

The energy discharge devices 102 would typically be electrically isolated, as with the connecting charging units and switches. Additionally, neighboring energy discharge devices can be fired effectively simultaneously to create an electrically conducting path 108, as previously discussed with regard to FIGS. 13 and 14. The energy discharge devices 102 can also be fired successively in pairs to use the electric discharges to sweep the fluid 105 outward toward the tips of the wing 150. Either with or without electric discharge, this method of sweeping fluid toward the wingtips also directs the fluid over and under the wing 150. Environmental sensors can also be included to monitor performance and be coupled to the energy discharge devices to modify the different parameters of the energy deposition.

EXAMPLE 9

Application of the method of the present invention to a submersible body 101 is illustrated in FIGS. 21A, 21B. Energy is emitted from an energy discharge device 102 located in the submersible body 101 along an extended path 108 in the liquid 105 ahead of the body 101. The electromagnetic coupling constants to dense fluid, such as liquid 105, are typically greater than those to gas, and the strongly heated liquid 105 can also vaporize. This results in a channel 160 of gas developing from the heated liquid path 108 through which the body 101 can pass. This channel 160 of gas has a very low-density, compared to its liquid. As a result, even if the body 101 is not traveling supersonically, and there is no shock wave, a significant decrease in drag on the body 101 occurs. Additionally, the path 108 can be actively directed in different directions to asymmetrically change pressures exerted against the body 101 to steer the body 101 through the liquid 105. The approach of actively directing the heated path 108 to asymmetrically change pressures exerted against the body 101 to steer the body 101 can also be used when the body 101 is traveling through a gas, such as air.

EXAMPLE 10

FIG. 22 illustrates use of the method of the present invention to provide a heated core 160 from an energy discharge device 102 positioned in front of the shock wave 103 of a body 101. As shown, the energy discharge device 102 can be positioned at a location 152 remote from the body 101. In this manner, the energy discharge device 102 discharges energy to create an extended heated core 160 in front of the body 101 and/or the shock wave 103. The remote location 152 may be land-based, sea-based, or space-based, which may dictate the form of the energy deposition.

EXAMPLE 11

FIG. 23 illustrates the use of an energy discharge device 102 to heat along an extended path 108 ahead of a protrusion 154 on a body 101. The protrusion 152 on the body 101 can be a source of additional drag on the body 101. As such, by using an energy discharge device 102 to heat along an extended path 108 ahead of the protrusion 154, the drag due to the protrusion 154 can be reduced. Additionally, the temperature and pressure at the protrusion 154 can be reduced through control of supersonic flow, a shock wave, or interacting shock waves.

EXAMPLE 12

Figure 24:
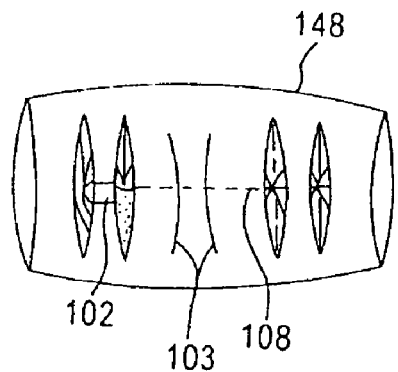
FIG. 24 is a cross-section view of a propulsion unit using energy discharge devices in accordance with the present invention.
Figures 25A, 25B, 25C, 25D:
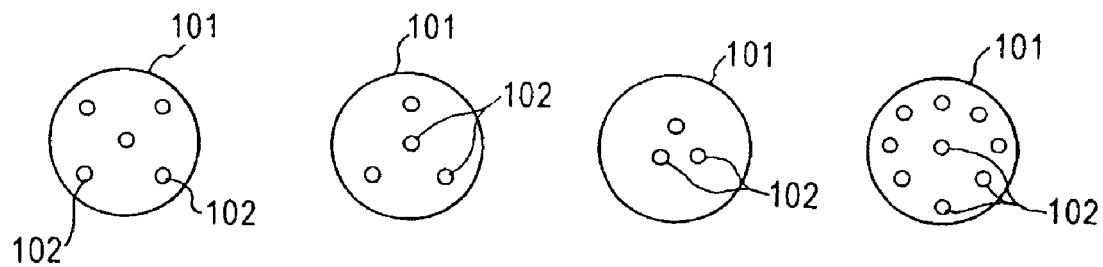
FIGS. 25A–25E illustrate several examples of the different geometries in which energy discharge devices can be arranged on a body in accordance with the present invention.
Figure 25E:
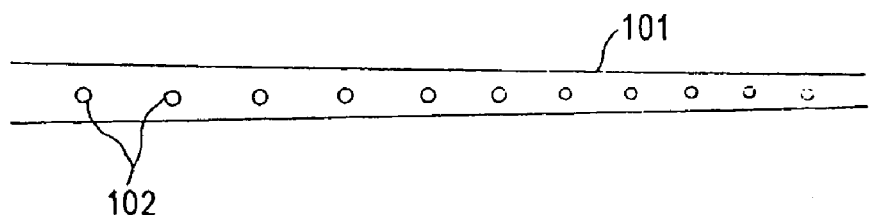

FIG. 24 illustrates the use of an energy discharge device 102 in a propulsion unit 148 to deposit energy along an extended path 108 within the propulsion unit 148. The creation of a heated core along the extended path can be used to puncture/disrupt any internal shock waves 103, as well as resonances, that may be established within the propulsion unit 148.

EXAMPLE 13

FIGS. 25A–E illustrate some examples of the great variety of different geometries in which energy discharge devices 102 can be arranged on a body 101. The different geometries of energy discharge devices 102 can be arranged to reduce drag on the body 101, maneuver the body 101, mitigate sonic boom, or control a shock wave and/or fluid flow, for example by sweeping fluid in given directions, including cylindrically or linearly outward. In addition, the application of a linear array of energy discharge devices 102 can be formed on the blades of a helicopter rotor to reduce the helicopter's acoustic signature.

EXAMPLE 14

Figure 26:
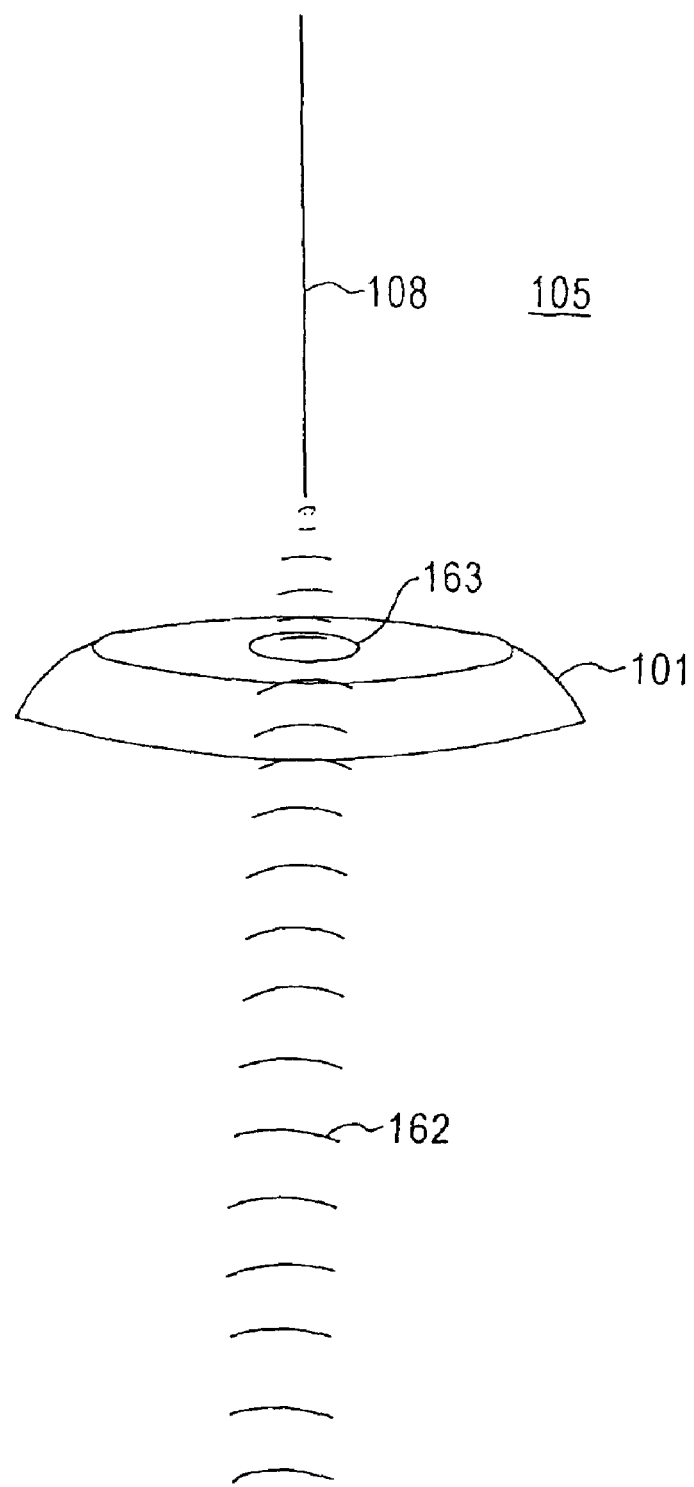
FIG. 26 is a side view of an energy discharge device located away from a light craft being used to direct energy ahead of the craft in accordance with the present invention.

FIG. 26 illustrates the use of the present invention to form a heated core in front of a light craft 101 without the need of providing an energy discharge device on the craft 101. In operation, a beam 162 of electromagnetic energy is directed toward the craft 101. The craft 101 includes focussing elements 163 that will further focus the beam 162 to heat the fluid 105 in front of the craft 101 along an extended path 108. The path 108 can be in the form of a line of heated/ionized gas resulting from a "filamenting" laser pulse, as previously discussed.

Such a concept would allow the craft 101 to take advantage of the shock wave/flow control and drag reduction provided by use of the invention without having to carry the energy generation equipment. Such a concept can also be used with an additional directed electromagnetic energy unit used to provide propulsion for the light craft 101 of the type known to those familiar with the art. Such a system could be used as an inexpensive launch vehicle from a planet with an atmosphere.

EXAMPLE 15

Figure 27A:
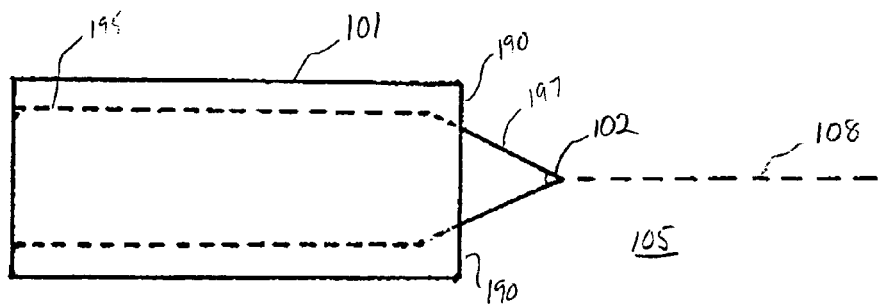
FIGS. 27A–C illustrate examples of modifying an amount of air reaching a symmetrical inlet(s) of a projectile in accordance with the present invention.
Figure 27B:
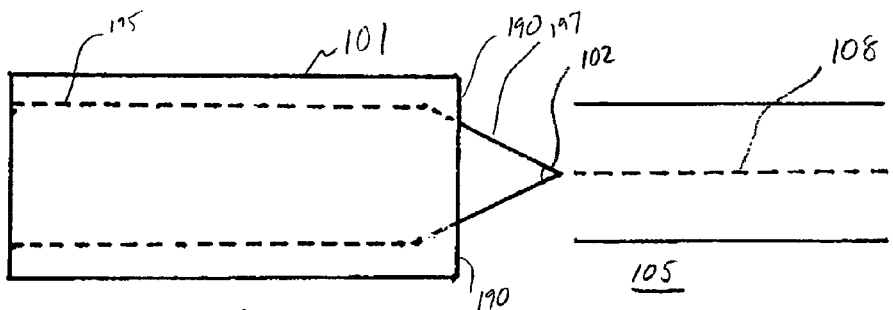
Figure 27C:
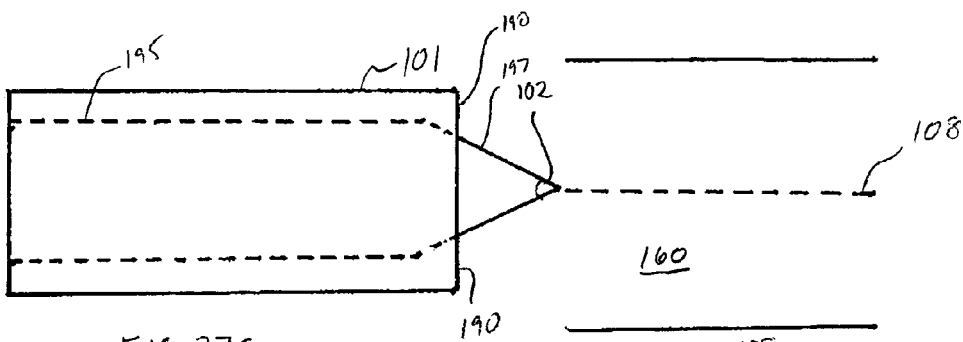
Figure 28:
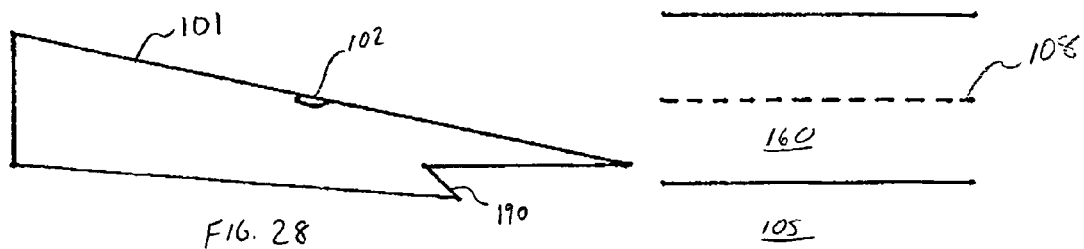
FIG. 28 illustrates a projectile having a non-symmetrical inlet(s) in accordance with the present invention.

FIGS. 27A, 27B and 27C illustrate the use of the present invention to form a volume of low-density, heated fluid, hereinafter referred to as core 160, in a fluid 105 through which a body 101 will pass. The body 101 can contain a shroud encompassing one or more symmetrical inlets 190 that surround the body 101. FIG. 28 illustrates an alternative embodiment using the same technique in which the body 101 includes one or more non-symmetrical inlets 190. In FIG. 27A, an energy discharge device 102 positioned on the body 101 heats gas, such as air, along an extended path 108 from the body 101. The energy discharge device 102 can also be adjusted to change the orientation of the extended path 108 relative to an orientation of the body 101.

Although not limited in this manner, the body 101 includes a propulsion system 195, such as a scramjet engine. Although not limited in this manner, the cowling 197 directs a shockwave (not shown) directly into the inlet 190 to be used in the propulsion system 195. An example of such a device would be a projectile, which may or may not be gun-launched. One disadvantage of a class of prior scramjet-powered projectiles is that they can only work at very high altitudes, such as 80,000 ft., since air is too dense, for example, near sea level. The reason for this is at least two-fold. A high density atmosphere creates significant friction and heating, which wears the projectile down before it can travel the desired distance. In addition, the amount of air entering the scramjet may be too great to be properly handled by the propulsion system 195. As the projectile is preferably gun-launched, such a projectile previously could not be practically implemented because of the impracticalities of gun-launching the projectile at high altitudes.

The present invention, however, is capable of overcoming the problems associated with a high density atmosphere by decreasing the density of the air in front of the projectile, thereby allowing the projectile to be launched from conventional ground- or sea-based systems in addition to air-based systems. In the same manner, the extent to which the density is decreased can also be changed by varying the temperature and the size of the core 160. This enables tailoring of an exact amount of air to be provided to the propulsion system 195. For example, in FIG. 27C, the low-density core 160 can push most of the air 105 completely out of reach of the intake 190, or as shown in FIG. 27B, the low-density core 160 can provide a considerable amount of the air 105 to the inlet 190. Alternatively, the low-density core 160 can allow some intermediate amount of air 105 to enter the inlets 190 (not shown).

The present invention can be practiced by employing conventional materials, methodology and equipment. Accordingly, the details of such materials, equipment and methodology are not set forth herein in detail. In the previous descriptions, numerous specific details are set forth, such as specific electromagnetic pulse details, materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only an exemplary aspect of the present invention and but a few examples of its versatility are shown and described in the present disclosure. It is to be understood that the present invention is capable of use in various other combinations and environments and is capable of changes or modifications within the scope of the inventive concept as expressed herein.

What is claimed is:

1. A method of decreasing drag of a body passing subsonically along a direction through a fluid, comprising the steps of:
   emitting energy along an extended path in the fluid;
   heating fluid along the path to decrease the density of fluid around the path and to form a volume of heated fluid expanding outwardly from the path; and
   directing the path parallel to the direction the body passes through the fluid, wherein the body passes through the volume of decreased-density heated fluid and whereby the reduction of density of the fluid decreases the drag on the body, and the heating of the fluid at different points along the path occurs simultaneously.

2. The method according to claim 1, wherein electromagnetic energy heats the fluid along the path.

3. The method according to claim 1, further comprising the step of repeating said steps of emitting energy, heating fluid, and directing the path.

4. The method according to claim 1, wherein multiple paths are formed within the fluid.

5. The method according to claim 1, wherein said energy is emitted from said body.

6. A method of decreasing drag of a body passing subsonically along a direction through a fluid, comprising the steps of:

emitting energy along an extended path in the fluid;

heating fluid along the path to decrease the density of fluid around the path and to form a volume of heated fluid expanding outwardly from the path; and directing the path parallel to the direction the body passes through the fluid, wherein the body passes through the volume of decreased-density heated fluid and whereby the reduction of density of the fluid decreases the drag on the body, and wherein the fluid includes a liquid.

7. The method according to claim 6, wherein said energy is emitted from said body.

8. A method of decreasing drag of a body passing subsonically along a direction through a fluid, comprising the steps of:

emitting energy along an extended path in the fluid;

heating fluid along the path to decrease the density of fluid around the path and to form a volume of heated fluid expanding outwardly from the path;

actively changing a direction of the path through the fluid; and directing the path parallel to the direction the body passes through the fluid, wherein the body passes through the volume of decreased-density heated fluid and whereby the reduction of density of the fluid decreases the drag on the body.

9. The method according to claim 8, wherein the step of heating the fluid causes lateral movement of the fluid away from an area in the fluid to which the energy is applied.

10. The method according to claim 8, wherein said energy is emitted from said body.

11. A method of decreasing drag of a body passing transonically along a direction through a fluid, comprising the steps of:

emitting energy along an extended path in the fluid;

heating fluid along the path to decrease the density of fluid around the path and to form a volume of heated fluid expanding outwardly from the path; and directing the path parallel to the direction the body passes through the fluid, wherein the body passes through the volume of decreased-density heated fluid and whereby the reduction of density of the fluid decreases the drag on the body, and the heating of the fluid at different points along the path occurs simultaneously.

12. The method according to claim 11, wherein electromagnetic energy heats the fluid along the path.

13. The method according to claim 11, further comprising the step of repeating said steps of emitting energy, heating fluid, and directing the path.

14. The method according to claim 11, wherein multiple paths are formed within the fluid.

15. The method according to claim 11, wherein said energy is emitted from said body.

16. A method of decreasing drag of a body passing transonically along a direction through a fluid, comprising the steps of:

emitting energy along an extended path in the fluid;

heating fluid along the path to decrease the density of fluid around the path and to form a volume of heated fluid expanding outwardly from the path; and directing the path parallel to the direction the body passes through the fluid, wherein the body passes through the volume of decreased-density heated fluid and whereby the reduction of density of the fluid decreases the drag on the body, and wherein the fluid includes a liquid.

17. The method according to claim 16, wherein said energy is emitted from said body.

18. A method of decreasing drag of a body passing transonically along a direction through a fluid, comprising the steps of:

emitting energy along an extended path in the fluid;

heating fluid along the path to decrease the density of fluid around the path and to form a volume of heated fluid expanding outwardly from the path;

actively changing a direction of the path through the fluid; and directing the path parallel to the direction the body passes through the fluid, wherein the body passes through the volume of decreased-density heated fluid and whereby the reduction of density of the fluid decreases the drag on the body.

19. The method according to claim 18, wherein the step of heating the fluid causes lateral movement of the fluid away from an area in the fluid to which the energy is applied.

20. The method according to claim 18, wherein said energy is emitted from said body.

21. A method of decreasing drag of a body passing along a direction through a fluid, comprising the steps of:

emitting energy through an aerodynamic window along an extended path in the fluid, wherein the aerodynamic window maintains a pressure gradient between a controlled atmosphere cavity within the body and the external atmosphere;

heating fluid along the path to decrease the density of fluid around the path and to form a volume of heated fluid expanding outwardly from the path; and directing the path parallel to the direction the body passes through the fluid, wherein the body passes through the volume of decreased-density heated fluid and whereby the reduction of density of the fluid decreases the drag on the body, and the heating of the fluid at different points along the path occurs simultaneously.

22. The method according to claim 21, wherein said energy is emitted from said body.

23. The method according to claim 21, wherein the aerodynamic window comprises a gas stream that is roughly transverse to the emitting energy.

24. The method according to claim 21, wherein the body is traveling transonically or subsonically.

25. A method of forming a channel in a fluid, comprising the steps of:
  emitting energy along an extended path in the fluid, wherein said energy is emitted from a body moving subsonically through said fluid;
  heating fluid along the path to decrease the density of fluid around the path and to form a volume of heated fluid expanding outwardly from the path to create a channel of decreased-density heated fluid; and
  directing the path parallel to the direction the body moves through the fluid,
  wherein the body moves through the channel, and
  the heating of the fluid at different points along the path occurs simultaneously.

26. The method according to claim 25, wherein the fluid includes a liquid.

27. The method according to claim 25, wherein the fluid includes a liquid.

28. A method of forming a channel in a fluid, comprising the steps of:
  emitting energy along an extended path in the fluid, wherein said energy is emitted from a body moving subsonically through said fluid;
  heating fluid along the path to decrease the density of fluid around the path and to form a volume of heated fluid expanding outwardly from the path to create a channel of decreased-density heated fluid;
  actively changing a direction of the path through the fluid; and
  directing the path parallel to the direction the body moves through the fluid,
  wherein the body moves through the channel.

29. A method of forming a channel in a fluid, comprising the steps of:
  emitting energy along an extended path in the fluid, wherein said energy is emitted from a body moving transonically through said fluid;
  heating fluid along the path to decrease the density of fluid around the path and to form a volume of heated fluid expanding outwardly from the path to create a channel of decreased-density heated fluid; and
  directing the path parallel to the direction the body moves through the fluid,
  wherein the body moves through the channel, and
  the heating of the fluid at different points along the path occurs simultaneously.

30. A method of forming a channel in a fluid, comprising the steps of:
  emitting energy along an extended path in the fluid, wherein said energy is emitted from a body moving transonically through said fluid;
  heating fluid along the path to decrease the density of fluid around the path and to form a volume of heated fluid expanding outwardly from the path to create a channel of decreased-density heated fluid;
  actively changing a direction of the path through the fluid; and
  directing the path parallel to the direction the body moves through the fluid,
wherein the body moves through the channel.

31. A method of forming a channel in a fluid, comprising the steps of:
  emitting energy through an aerodynamic window along an extended path in the fluid, wherein said energy is emitted from a moving body;
  heating fluid along the path to decrease the density of fluid around the path and to form a volume of heated fluid expanding outwardly from the path to create a channel of decreased-density heated fluid; and
  directing the path parallel to the direction the body moves through the fluid,
  wherein the body moves through the channel, and
  the heating of the fluid at different points along the path occurs simultaneously.

* * * * *